United States Patent [19]

Mouro et al.

[11] Patent Number: 5,289,465
[45] Date of Patent: Feb. 22, 1994

[54] METHOD FOR DATA TRANSMISSION OVER AN INTERNAL BUS OF A WORKSTATION APPARATUS WITH AN INTERNAL BUS FOR IMPLEMENTING THE METHOD, AND AN ADAPTER CIRCUIT FOR THE INTERNAL BUS

[75] Inventors: Alain Mouro, Epinary Sur Seine; Michel Colin, Noisy Le Roi, both of France

[73] Assignee: Bull S.A., Paris, France

[21] Appl. No.: 927,800

[22] Filed: Aug. 10, 1992

Related U.S. Application Data

[63] Continuation of Ser. No. 452,512, Dec. 19, 1989, abandoned.

[51] Int. Cl.$^5$ .......................... H04J 3/16; H04L 12/40
[52] U.S. Cl. ..................... 370/82; 370/85.9; 370/105.1; 370/110.1; 340/825.52; 395/275
[58] Field of Search ............... 340/825.03, 825.07, 340/825.2, 825.21, 825.52, 825.53

[56] References Cited

U.S. PATENT DOCUMENTS

| | | | |
|---|---|---|---|
| 4,547,880 | 10/1985 | De Vita et al. | 370/85.1 |
| 4,656,627 | 4/1987 | Hasley et al. | 370/85.11 |
| 4,680,754 | 7/1987 | Fechalos | 370/105.1 |
| 4,697,263 | 9/1987 | Beaufoy | 370/85.1 |
| 4,792,800 | 12/1988 | Fujioka et al. | 370/85.1 |
| 4,912,704 | 3/1990 | Bonicioli et al. | 370/85.1 |
| 4,914,654 | 4/1990 | Matsuda et al. | 370/85.1 |

Primary Examiner—Benedict V. Safourek
Assistant Examiner—Hassan Kizou
Attorney, Agent, or Firm—Kerkam, Stowell, Kondracki & Clarke

[57] ABSTRACT

A method of data transmission over an internal bus of a workstation, effecting communication of an interface coupler and a telephone line and devices adapted for various communication functions. The method employs the synchronization signal of a voice network to define 125-microsecond communication frames. Included in each 125-microsecond frame thus defined are a maximum of eight variable-length subframes corresponding to a maximum of eight devices. The first two bytes of each subframe are header bytes. Coded in the header bytes of each subframe are a device destination address, and length codes indicating the number of bytes of data included in the subframe and the number of active bits in the last byte.

16 Claims, 21 Drawing Sheets

METHOD FOR DATA TRANSMISSION OVER AN INTERNAL BUS OF A WORKSTATION APPARATUS WITH AN INTERNAL BUS FOR IMPLEMENTING THE METHOD, AND AN ADAPTER CIRCUIT FOR THE INTERNAL BUS

This is a continuation of application Ser. No. 07/452,512, filed Dec. 19, 1989, now abandoned.

BACKGROUND OF THE INVENTION

The present invention relates to a method for data transmission over an internal bus included in a workstation, apparatus with an internal bus implementing of the method, and an adapter circuit for this internal bus.

Transmission means enabling a plurality of office computers to communicate with one another are known in the prior art. Depending on the transmission distance, either a local area network (LAN) or the public telecomununications network comprising a wide area network (WAN) is used. Thus far, computers coupled to one another by one of these two means exchange only digital information.

The new digital switched network, also known as digital integrated services network (RNIS), functions by multichannel transmission, which will soon make it possible to integrate a plurality of services of different bandwidths, such as voice, alphanumeric data, or images that have been compressed for transmission.

Workstations in which the voice arrives over one line while alphanumeric data arrive over a specialized data line are already known.

SUMMARY OF THE INVENTION

One of the objects of the present invention is to permit connecting the facilities of the digital integrated services network (RNIS) to the resources of an office workstation of the microcomputer or minicomputer type.

Accordingly, in combination with the computer workstation, which includes a system bus, there are provided a telephone communication line interface coupler, a multi-protocol communication monitor device connected to the workstation system bus, a voice processing device connected to the workstation system bus, and an internal bus apparatus having an internal bus and connecting said telephone communication line interface coupler device via said internal bus to said multi-protocol communication monitor device and to said voice processing device.

Another object of the invention is to provide a method of data transmission over an internal bus of a workstation of the above type.

This object is attained by having the transmission method comprise employing the synchronization signal of a voice network to define a 125-microsecond communication frame, including in each frame a maximum of eight variable-length subframes respectively corresponding to a maximum of eight devices, each of the subframes having a plurality of bytes including first and second header bytes and potentially including data bytes in turn including data bits, coding the first five bits of the first header byte to indicate the number of data bytes in the subframe, coding the next three bits of the first header byte to indicate the number of active bits in the final data byte, and coding four bits of the second header byte to indicate a device destination address.

In another feature, adapter circuitry is provided for each device operable to process only subframes in which the coupler destination address coded in the second header byte corresponds to the particular device.

In another feature, each variable-length subframe has a maximum length of 32 bytes.

In another feature, the first header byte of a subframe having zero data bytes is coded with the value hexadecimal FF.

Another object of the invention is to provide an apparatus employing the transmission method.

Accordingly, an internal bus apparatus for a computer workstation is provided, the apparatus including an internal bus including an input-output data line, a frame synchronization line and a bit clock line. The internal bus serves to put the following into communication: via a first adapter circuit a telephone line interface, via a second adapter circuit a multi-protocol communication monitor device, via a third adapter circuit a serial interface for at least one of a printer and a scanner, via a fourth adapter circuit an image processor for compression and decompression of images, and via a fifth adapter circuit a voice processor for at least one of voice analysis and voice synthesis.

In another feature, the multi-protocol communication monitor device, the image processor and the voice processor are each connected to the workstation system bus.

Another object of the invention is to provide an adapter circuit enabling the connection of the aforementioned devices to the internal bus employing the method above.

Accordingly, an adapter circuit for an internal data bus provides at least two serial transmission channels and at least two serial reception channels. The adapter circuit includes a transmission channel circuit for each of the serial transmission channels, a reception channel circuit for each of the serial reception channels, a bank of five-bit registers connected to the transmission channel circuits and to the reception channel circuits, a subframe description circuit connected to the internal data bus, subframe address enable and control circuitry.

In another feature, at least one register of the register bank contains a subframe address corresponding to a transmission or reception channel, and an enable bit for at least one of the channels.

In another feature, at least one register of the register bank contains a destination address and a transmission enable bit.

In another feature, at least one register of the register bank contains bits representing line states of channels operating in the transmission mode.

In another feature, at least one register of the register bank contains bits representing line states of channels operating in the reception mode.

In another feature, at least one register of the register bank is a status register including synchronization and subframe descriptor states.

In another feature, each transmission channel circuit includes a FIFO transmission register for each channel having a serial input for receiving in bit serial form subframe data to be transmitted at the rate of a processor clock, and a serial output for transmitting subframe data at the rate of a bit clock, a counter for counting pulses from the processor clock for determining the number of data bits to be transmitted for the subframe indicating subframe length, the counter having a parallel output, a parallel in, serial out shift register having an input connected to the parallel output of the counter for receiving the subframe length, and having a serial output connected in parallel with the serial output of the FIFO transmission register, and said subframe address enable and control circuitry successively providing a length enable signal (VAL-T-LG) and a data enable signal (VAL-T-DAT) connected for respectively enabling the output of the shift register to transmit the subframe length and the output of the FIFO transmission register to transmit the subframe data.

In another feature, each reception channel circuit includes a FIFO reception register for each channel having a serial input for receiving bit serial data at the rate of the bit clock, a counter for counting bit clock pulses to count the number of bits clocked into the FIFO reception register to determine received subframe length, the counter being cleared to zero by a frame synchronization signal SYN-T, and a down counter register having parallel inputs connected to parallel outputs of said counter.

BRIEF DESCRIPTION OF THE DRAWINGS

Further characteristics and advantages of the invention will become more apparent from the following description, with reference to the accompanying drawings, in which.

DETAILED DESCRIPTION

Figure 1:
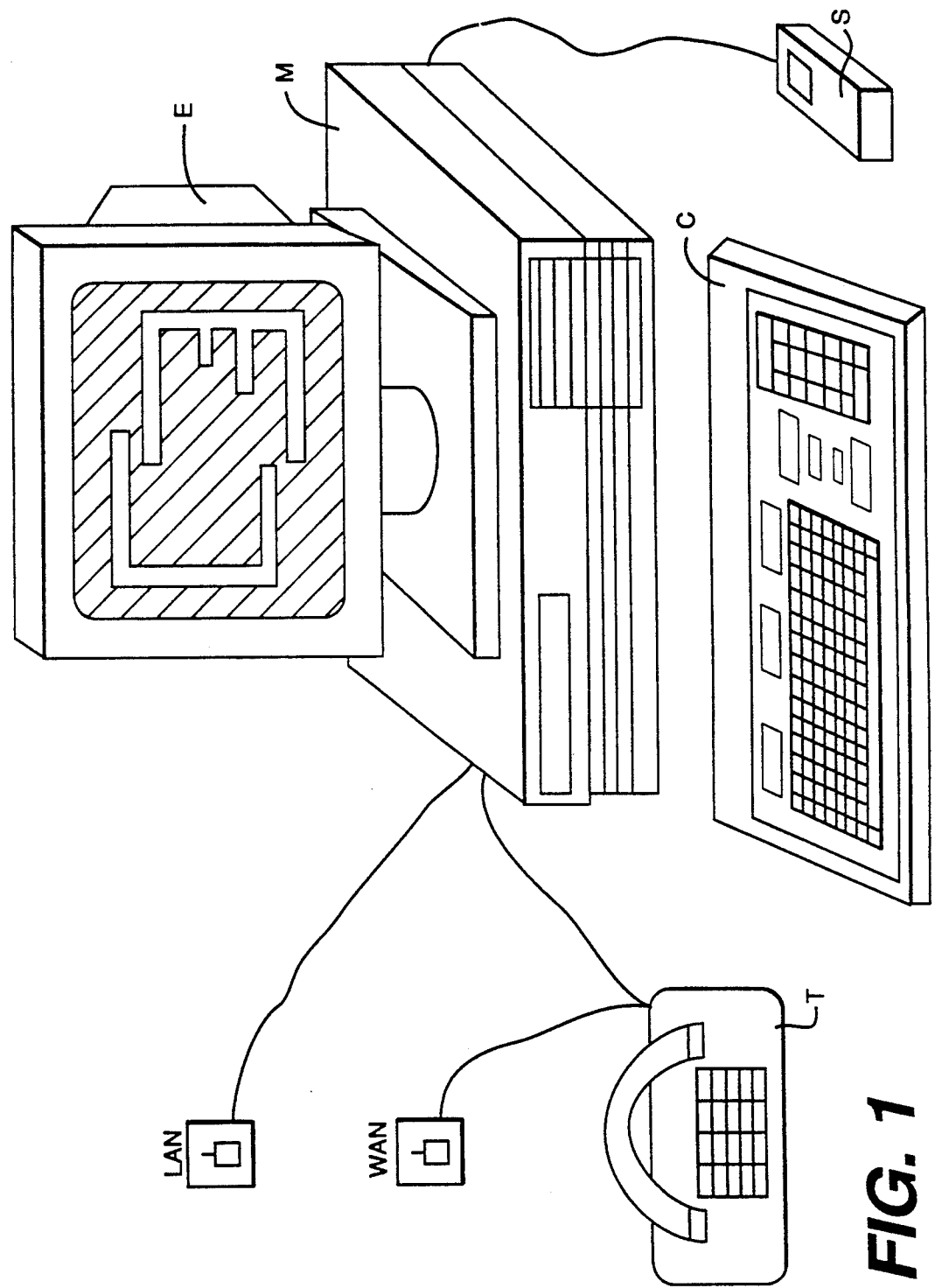
FIG. 1 is an overall view of a computer workstation employing the method and the apparatus of the invention.

FIG. 1 shows a workstation of the microcomputer or minicomputer type, including a central unit M, a screen E and a keyboard C, and optionally a mouse S. It is known in the prior art to connect such a workstation to a local area network (LAN) via coupler cards. It is also known to connect such a workstation directly to the public telecommunications network PTT with telecommunication cards of the type sold under the trade name KORTEX. However, KORTEX cards, for example, provide data transmission only and cannot process the voice or images.

The invention proposes direct connection of the workstation to a telephone T and to the public telecommunications network or wide area network (WAN), to permit transmission and reception of both voice and digital messages, the latter being either images or data. This workstation may be connected to an analog, TRANSCOM or RNIS type of telephone line. In passing, it may be noted that in one mode known as the SO mode, the known digital integrated services network (RNIS) includes three links. The first is a 16 kbps packet link and comprises the synchronization channel D; the other two are full duplex 64 kbps links.

Figure 2:
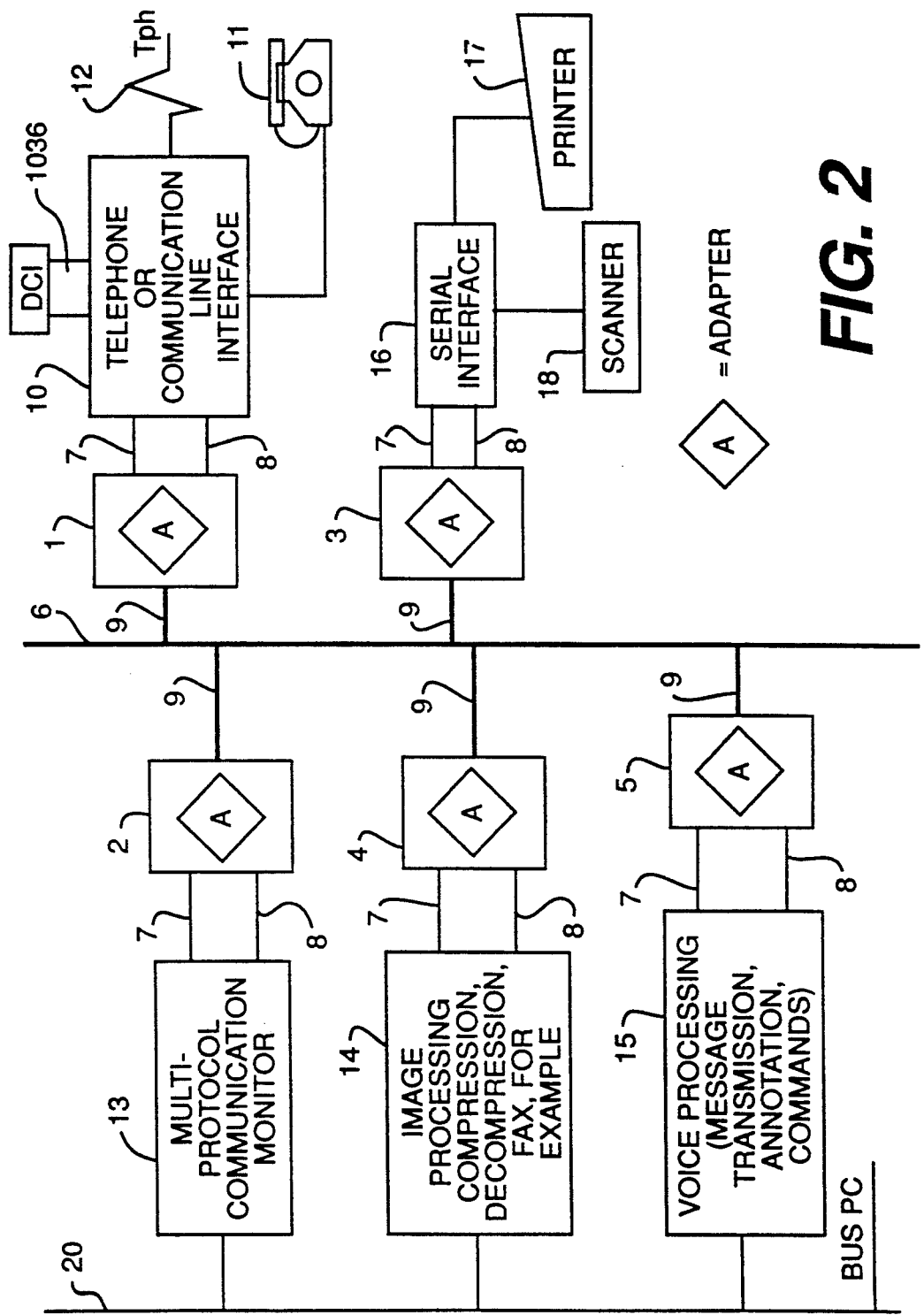
FIG. 2 is a schematic view of the internal serial bus of the invention and the principal functional elements linked with the system bus of the workstation.

FIG. 2 shows the internal transmission bus of the workstation that enables simultaneous management of a telephone communication, a packet data transmission link, or a Group 4 facsimile link. These serialized processing operations can be done during the transmission, because direct switching among line couplers is provided, as will be seen below.

In the diagram of FIG. 2 illustrating an exemplary embodiment, five adapter circuits 1–5 are connected to an internal serial bus 6. Each adapter circuit 1–5 is connected via connection 9 to the internal serial bus 6 and includes reception and transmission channels 7 and 8, respectively.

For example, the adapter circuit 1 is connected via a reception channel 7 and a transmission channel 8 to a communication line interface circuit 10 that processes signals received over a telephone line 12. This circuit 10 transmits the line signaling and control channel signals directly to the destination of the workstation system bus 20.

The adapter circuit 2 is connected via its reception channel 7 and its transmission channel 8 to a multiprotocol communication controller 13. This multiprotocol communication controller 13 is connected in turn to the workstation system bus 20.

Via its reception channel 7 and transmission channel 8, the adapter circuit 4 is connected to an image processing circuit 14 that performs the compression and decompression of images, for example with decoding, encoding, encrypting, or facsimile transmission functions, and so forth. This image processing circuit 14 is also connected to the workstation system bus 10.

The adapter circuit 5 is connected via its reception channel 7 and its transmission channel 8 to a circuit 15 for voice processing, performing the functions of messaging, annotation, vocal control of peripheral equipment or logic elements, etc. The voice processing circuit 15 is also connected to the system bus 20.

Finally, the adapter circuit 3 is connected to a conventional serial interface 16, which in turn is connected to a graphic printer 17 and an image scanner 18.

Figure 3A:
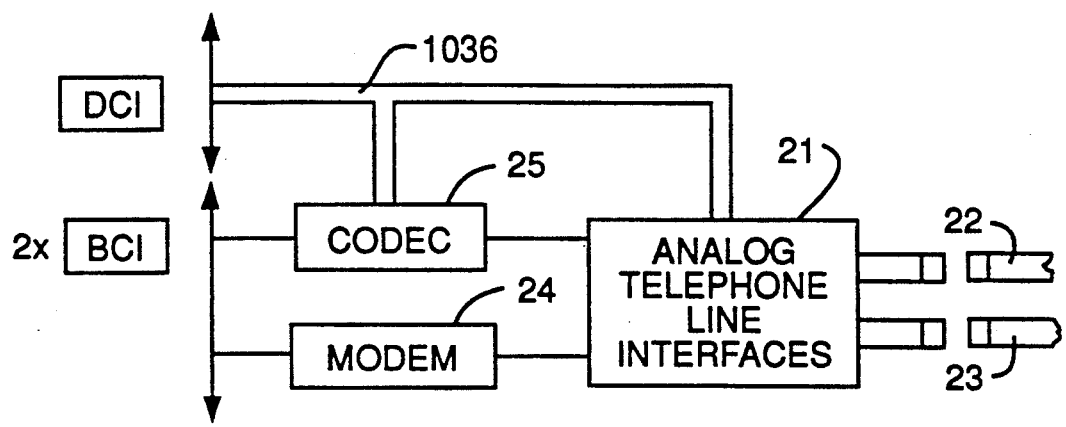
FIGS. 3a–3c show the various telephone line interfaces that may comprise the communication line interface of FIG. 1.
Figure 3B:
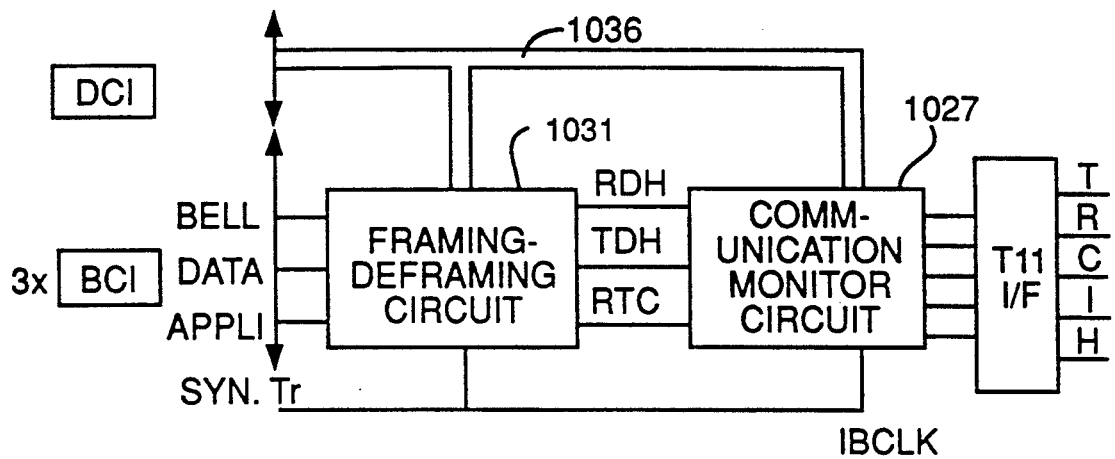
Figure 3C:
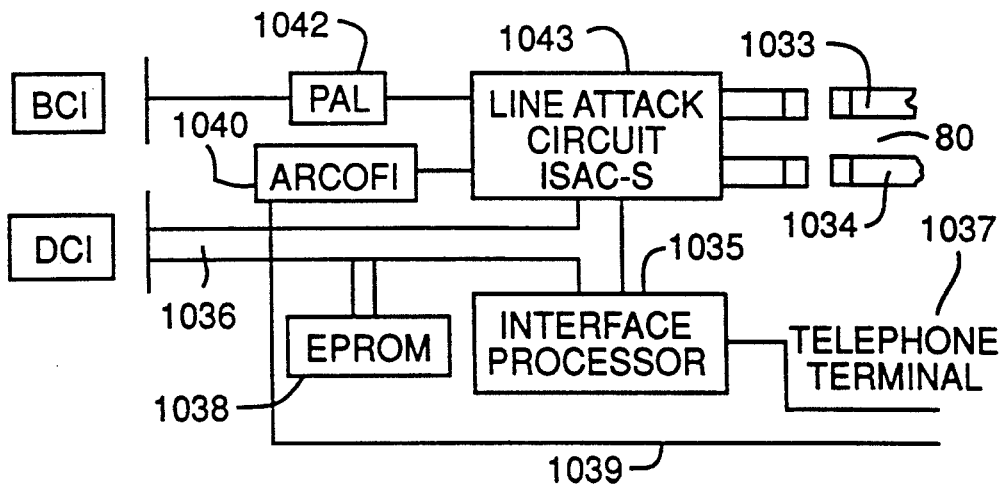

FIGS. 3a–3c, depict various circuits which may be employed as the communication line interface circuit 10 of FIG. 2, depending on the type of telephone line used. These various interface circuits are well known to those skilled in the art and so are described only briefly here.

FIG. 3a is an interface circuit for a telephone line functioning in the analog mode. A telephone line interface intended to support the invention includes a plurality of pilot interfaces 21 for each telephone line 22, 23 connected to the workstation. These interfaces are connected to an integrated modem 24 and a CODEC (coder/decoder) circuit 25. The CODEC 25 may be of the 29C50 type, sold by MHS or INTEL. A signaling channel 1036 enables the central processing unit to configure the interface with parameters such as type, whether uncoupled, tonality, decimal numbering or dialing, etc.

FIG. 3b shows an interface adapted to the TRANSCOM telephone line network, that is, interfaces of the X21 type. In such a network, the junction circuits of lines T (for data transmission), R (data reception), C (control), I (indication) are managed in the call control phase, or in the phase of release by the workstation via the internal bus 1036. The commands of the central processing unit are furnished to a communication monitor circuit X21 1027. This monitor could be the HC-5542 circuit sold by MHS. Similarly, via the DCI control interface bus 1036, the central processing unit furnishes the commands to a framing-deframing circuit 1031.

FIG. 3c shows an embodiment of a telephone line interface of the So type for an RNIS network. The SO network is for two pairs of telephone lines 1033 and 1034. A microprocessor 1035 manages the exchanges between a telephone station 1037 and the line attack circuit 1043 via the interface SO. This circuit 1043 may comprise the Siemens PEB2070 component. A programmable memory 1038 of the EPROM type contains the local control program, and the data arrive over a bus 1039 to a specialized processing circuit 1040, comprising an ARCOFI circuit, reference number PSB2160 sold by Siemens. The signaling is processed by the interface processor 1035. The data signals are transmitted over the bus via the output or outputs BCI, which depending on the telephone line interface circuits are two in number for the analog circuit, or three in number, transmitting sound, data and applications, for the TRANSCOM circuit type.

Figure 7:
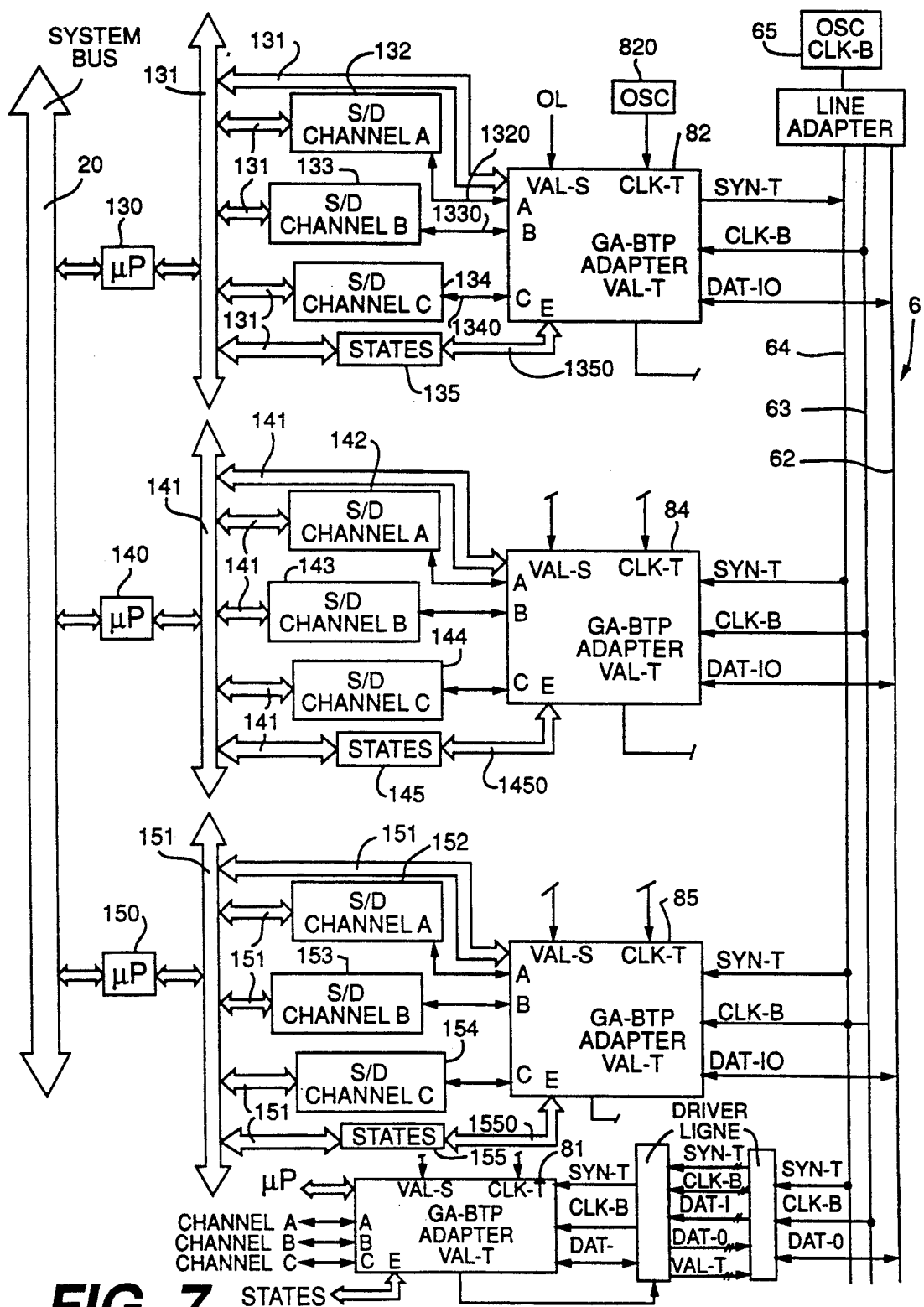
FIG. 7 is a more detailed schematic diagram of a portion of the system shown in FIG. 2.

The signals transmitted by the interface channel BCI comprise the internal serial bus 6, which in fact, as shown in FIG. 7, comprises a line 62 for input and output data DAT-IO, a line 64 transmitting the frame synchronization signal SYN-T, and a line 63 transmitting the bit clock CLK-B, which is furnished by an oscillator 65 having a frequency selected between 512 kHz and 2048 kHz depending on the frames that are to be transmitted over the bus 6.

Figure 11:
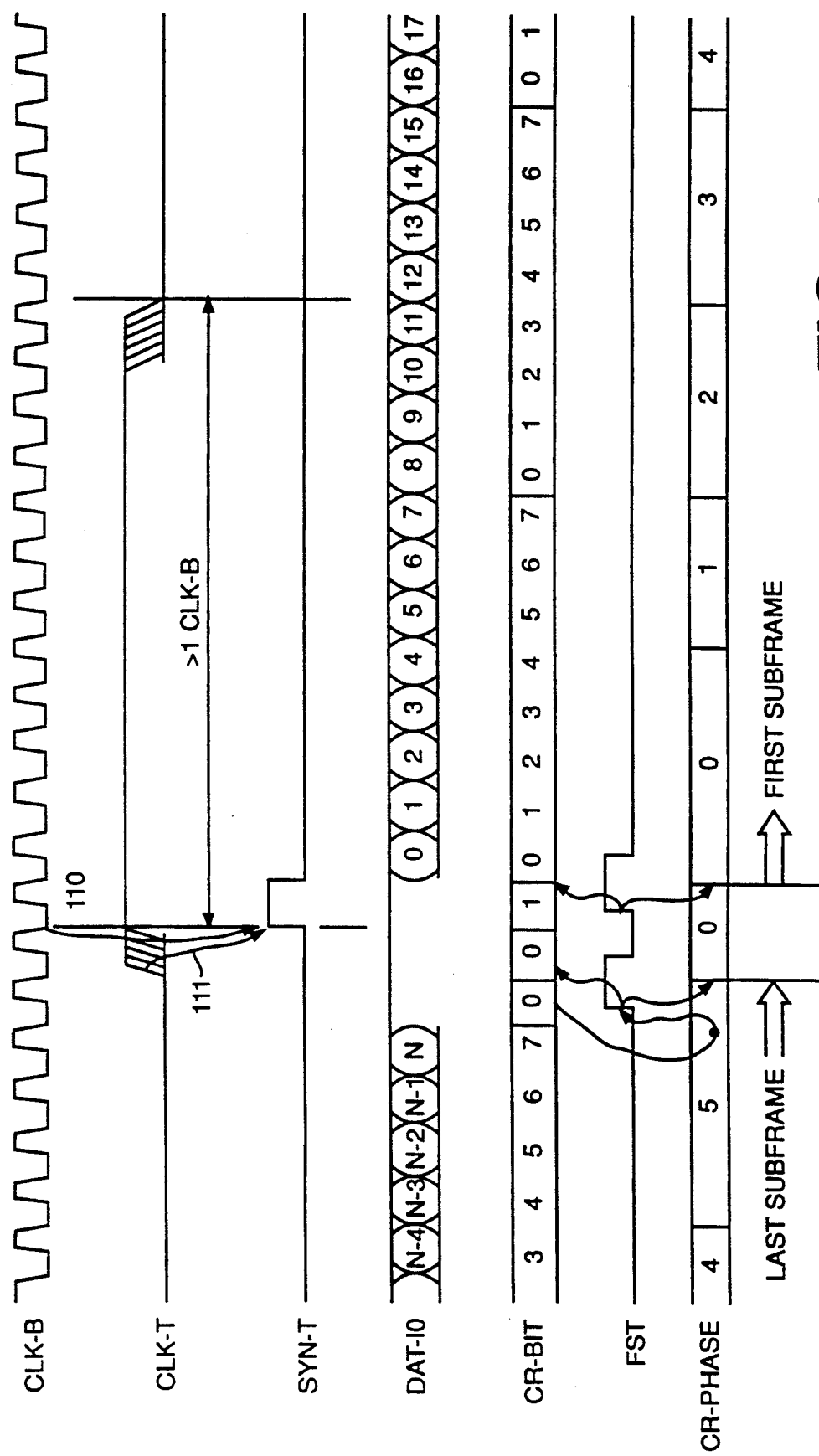
FIG. 11 is a waveform diagram depicting signals generated by the subframe description circuit of the adapter circuit.

The internal serial bus 6 is structured in 125-microsecond frames (8 kHz) conforming to the standards of the public network. Each of the bus adapter circuits 1–5 stores the data received between two frame synchronization signals FSB. If the number of bits received in one frame is between 0 and 8, the component emits these bits at the frequency of 64 kilobytes per second (kbps) over the bus; if the number of bits received is greater than eight between two frame synchronization signals (transmission higher than 64 kbps), the adapter circuit transmits the bits over the bus at the bus clock frequency (CLK-B) of between 512 kHz and 2048 kHz. Frame synchronization is derived from the synchronization signal generated by the line interface, based on the public network transmission synchronization signal (CLK-T), by synchronizing it to the bus clock (CLK-B), as represented by the arrows 110, 111 (FIG. 11).

The data line DAT-IO comprises the bus carrying the subframes transmitted by the set of adapter circuits, as will be seen below.

Figure 4:
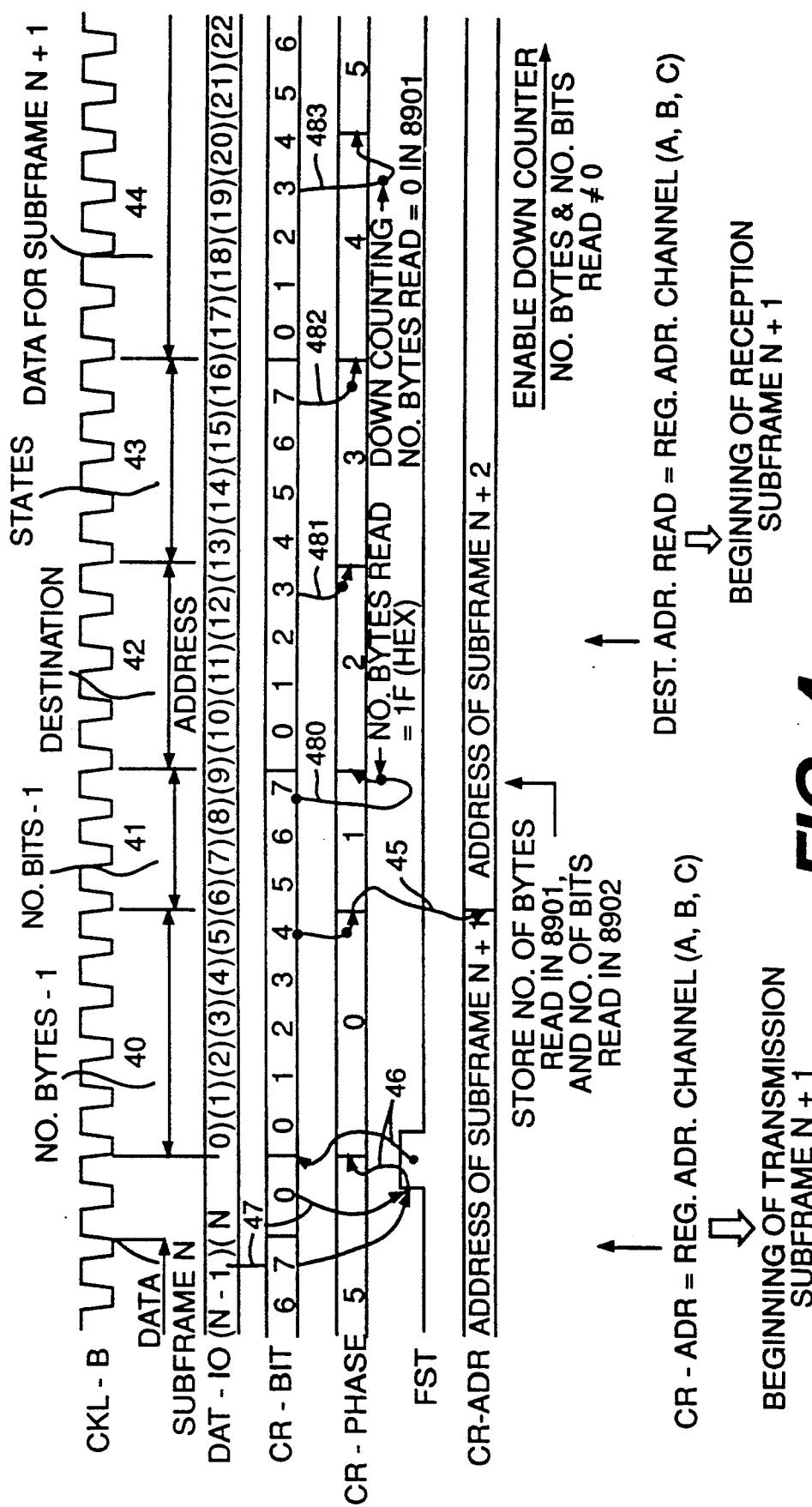
FIG. 4 is a waveform diagram of a subframe in accordance with the transmission method of the invention.

As shown in FIG. 4, for a subframe N+1 following a subframe N, bit serial data on the line DAT-IO begins with two 8-bit header bytes. Zones 40 and 41 comprise the first header byte of the subframe, and together indicate the length of the subframe in question. Zone 40 comprises five bits indicating the number of 8-bit bytes, minus one, of the subframe. This five-bit zone 40 is followed by a zone 41 which comprises three bits indicating the number of active bits, minus one, of the last 8-bit byte of the subframe. It will be appreciated that the two zones 40 and 41 comprising the first header byte may be viewed as a single 8-bit byte indicating the total number of bits in the subframe.

The second header byte of the subframe includes a zone 42 of four bits, comprising the destination address, that is, the address of the adapter circuit or processing circuit for which the data contained in the subframe are intended. The four last bits of the second 8-bit byte comprise the zone 43 and contain state data.

Finally, the subframe ends with a zone 44 comprising the data zone of the subframe. This data zone is of variable length, as will be seen in conjunction with FIG. 5.

The line CR-BIT of FIG. 4 represents the state of a bit counter register 8911 (FIGS. 8A and 8B) which counts the eight bits of each byte in each subframe. This bit counter register 8911 is reset to zero either at the end of eight CLK-B clock pulses or, as represented by arrows 46, upon a subframe synchronization pulse FST when the processing phase is in state "5" indicating the end of the fifth phase of the subframe N.

The line CR-PHASE of FIG. 4 represents the successive states of a processing phase counter 8912 (FIG. 8A) during each subframe. In FIG. 8B, the phase counter is shown as six individual outputs PH-0 through PH-5 of a phase evolution logic circuit 891X. The subframe synchronization pulse FST is produced at the leading edge of the clock CLK-B pulse that follows the change of the bit counter (CR-BIT) from the state "7" to the state "0" during phase "5" of a subframe, as represented by the arrows 47 of FIG. 4. Thus as will be seen hereinbelow, the microprocessor and the adapter circuit have different behavior in the course of phases "0", "1", "2", "3", "4" and "5".

The phase counter 8912 (CR-PHASE) advances from one state to the next as follows:

(1) As depicted by arrow 45, the phase counter 8912 changes from state "0" to state "1" when the bit counter 8911 has counted the fourth bit (bit "3").

(2) As depicted by arrow 480, the phase counter 8912 changes from state "1" to state "2" when the bit counter 8911 has counted the eighth bit (bit "7"), and if the value read in the zone 40, which contains the number minus one of 8-bit bytes of the message received or to be transmitted, is different from the hexadecimal value "1F" (all five bits having the value "1"), which equals decimal "31". This value hexadecimal "1F" or decimal "31" indicates that a subframe is "empty" or, in other words, does not contain any data.

(3) As depicted by arrow 481, the phase counter 8912 changes from state "2" to state "3", when the bit counter 8911 has counted the fourth bit (bit "3") in the second 8-bit byte.

(4) As depicted by arrow 482, the phase counter 8912 changes from state "3" to state "4" when the bit counter 8911 has counted the eighth bit (bit "7") in the second 8-bit byte.

Figure 8A:
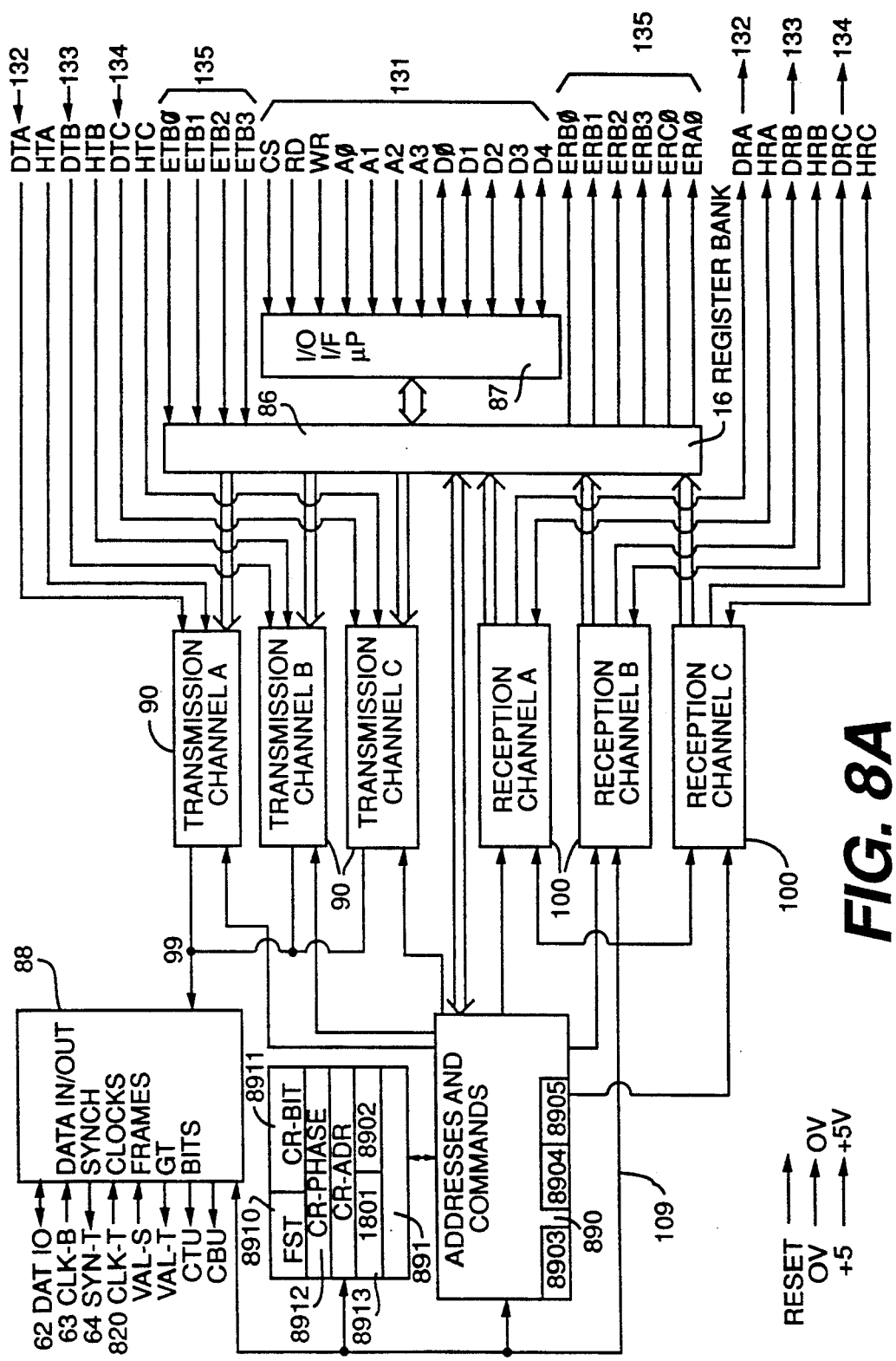
FIG. 8A is an overall schematic diagram of an adapter circuit.
Figure 8B:
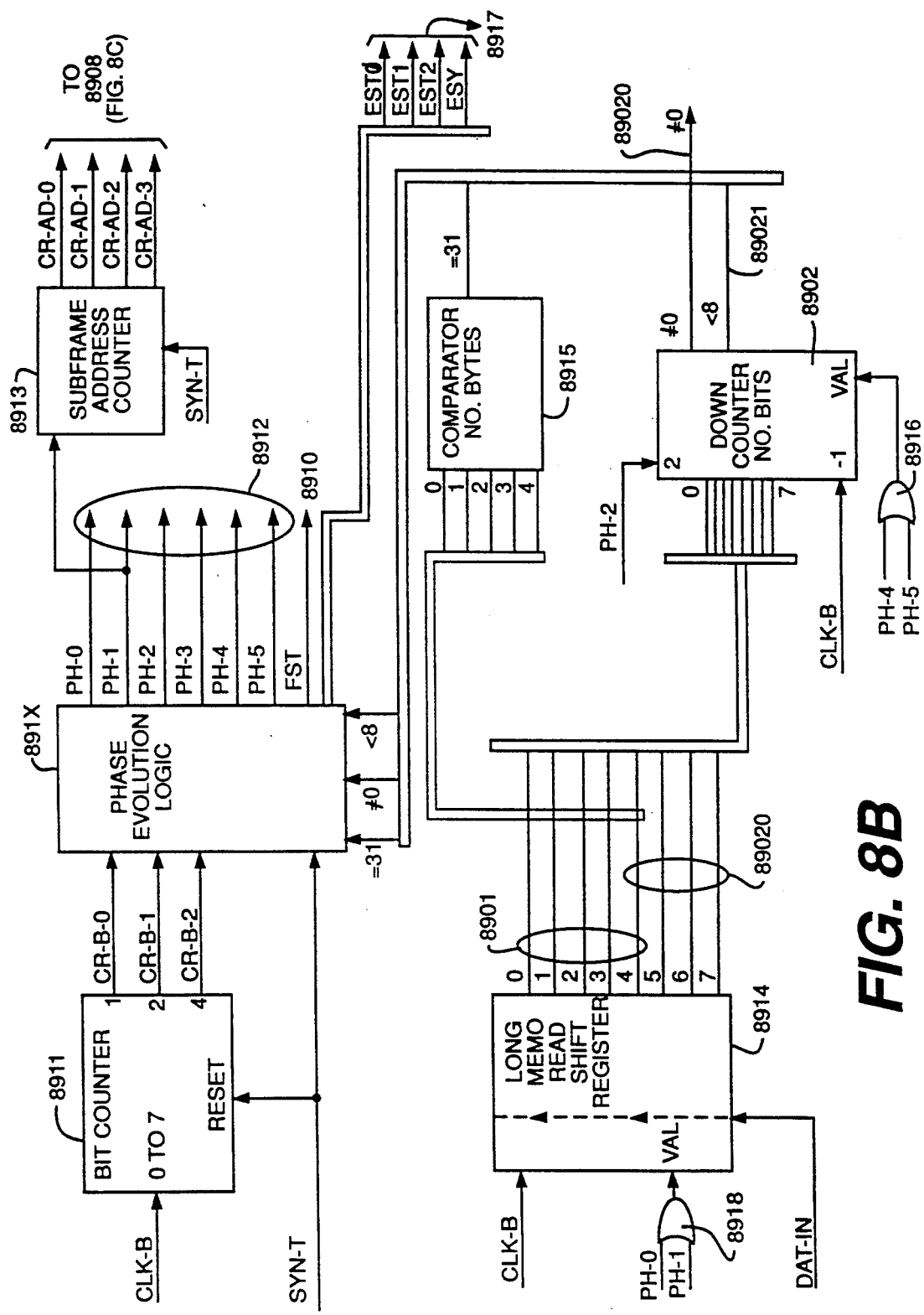
FIG. 8B is a schematic diagram of the subframe description circuit included in the adapter circuit.

(5) Finally, as depicted by arrow 483, the phase counter 8912 changes from state "4" to state "5" when the bit counter 8911 has counted the fourth bit (bit "3") following the change to the value "0" of a down counter 8901 (FIGS. 8A and 8B). A down counter 8902 is initially loaded with the contents of the zone 40 and decremented by one each time the bit counter 8911 has counted one.8-bit byte, beginning at the moment when it is in phase "4". Thus, the down counter 8902 at any instant represents the number of 8-bit bytes remaining to be read in a subframe, and is loaded at the end of phase "1".

Also loaded at the end of phase "1" is the down counter 8902 containing the number of bits remaining to be read in the final 8-bit byte of data. This down counter 8902 is decremented by one at each clock tick (CLK-B) during phase "5".

The final line CR-ADR in FIG. 4 represents the successive values of an address counting register 8913 (FIGS. 8A and 8B), which stores the address of the subframe the processing of which will be initiated later, following the fifth phase. The address register 8913 is incremented each time the bit counter 8911 indicates the end of the first zone 40 of the first 8-bit byte of one subframe and the phase counter 8912 (CR-PHASE) changes from state "0" to state "1", as represented by the arrow 45 in FIG. 4. Thus, at the transition between bit "4" and bit "5" of the bit counter 8911 (CR-BIT), the subframe address counter 8913 (CR-ADR) changes from the address of the subframe N+1 to the address of the subframe N+2.

Figure 5:
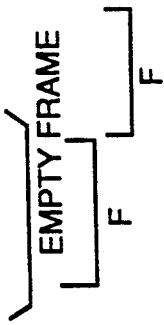
FIG. 5 shows waveform diagrams depicting subframes of various lengths.

Shown in FIG. 5 are the values of the bit counter 8911 register (CR-BIT), the phase counter 8912 (CR-PHASE) which defines the phases executed by the processing circuit of the adapter circuit or microprocessor, and lines 50-60 which for purposes of example represent the structures of subframes having different numbers of data bits.

The line 50 represents the structure of a subframe having one data bit, the line 51 represents the structure of a subframe having two data bits, the line 52 represents the structure of a subframe having five data bits, and the line 53 represents the structure of a subframe having eight data bits. The data bits are represented by the letter Z (corresponding to FIG. 4 zone 44), state bits are represented by the letter Y (corresponding to FIG. 4 zone 43), destination addresses bits are represented by the letter X (corresponding to FIG. 4 zone 42). It can be seen that the number of data bits Z is as specified during phase "1" by the second zone of the first 8-bit byte (corresponding to FIG. 4 zone 41). Thus, during phase "1", these three bits define the number of active bits, minus one, of the final 8-bit byte.

The lines 54, 55, 56, 57 in FIG. 5 represent the structures of subframes including 9, 11, 12 and 16 data bits, respectively.

Finally, lines 58, 59, 60 in FIG. 5 represent subframe structures in which phase "4" extends over a plurality of 8-bit bytes, and the data include 31 8-bit bytes of data. Line 58 includes 246 active data bits. Line 59 includes 247 active data bits. Line 60 includes the maximum, 248 active data bits in 31 bytes. In this case, the subframe includes 32 8-bit bytes, which correspond to a clock CLK-B of (32 bytes)×(8 bits per byte)×(8 kHz frame clock)=2048 kHz.

In the case where the bit clock CLK-B is at 2048 kHz, the number of 8-bit bytes between two synchronization signals is a maximum of 31, and the data bus may for instance carry a maximum of 31 8-bit bytes of data in one frame, or ten subframes each of one 8-bit byte of data, and hence four full duplex 64 kbps links, taking into account the addressing, which is over three bits, or six subframes of one 8-bit data byte, one subframe of four 8-bit data bytes and one subframe of five 8-bit data bytes.

It will be appreciated that the examples above are given for purposes of illustration and are not intended as a limitation of the invention.

Figure 6:
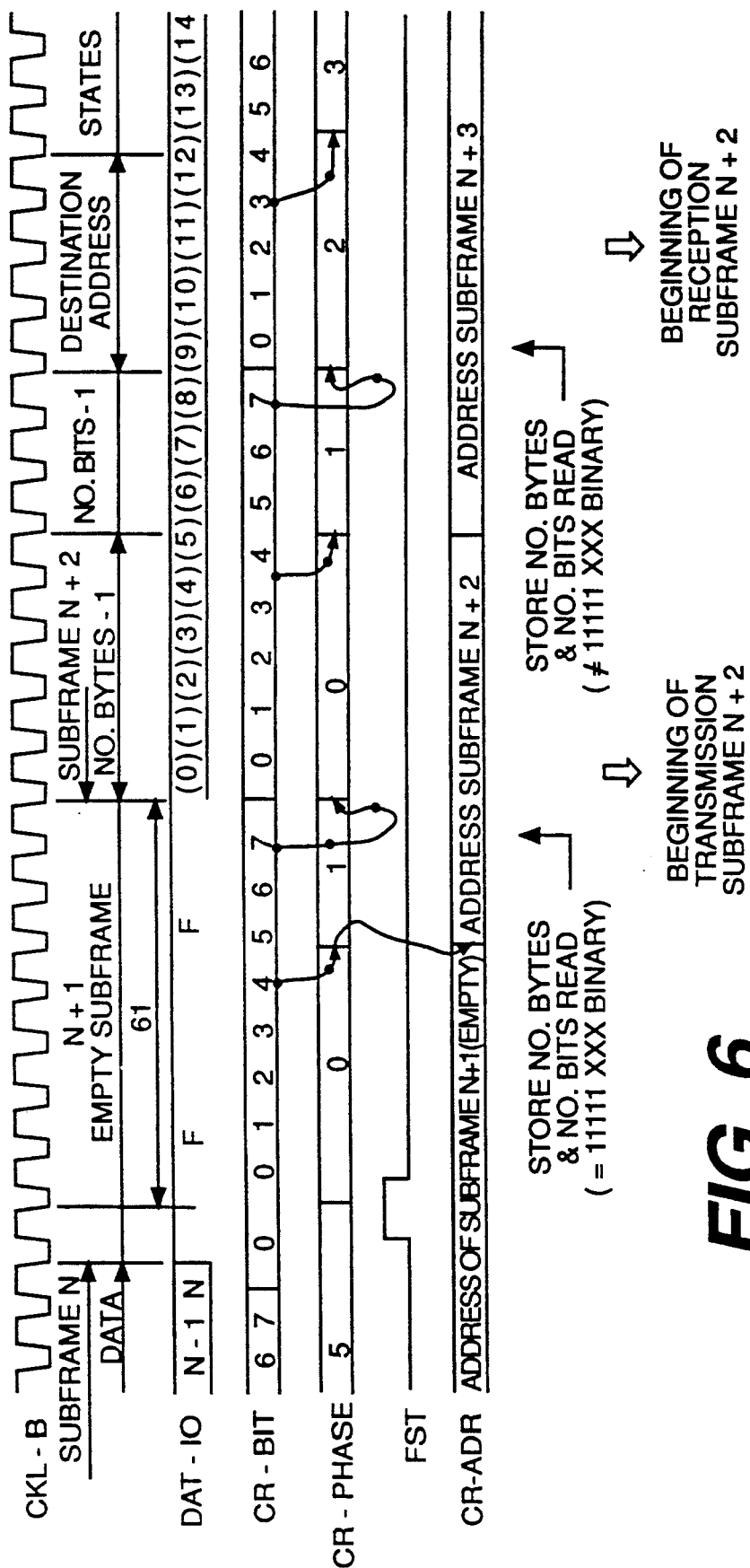
FIG. 6 is a waveform diagram depicting an empty subframe.

FIG. 6 and the last row of FIG. 5 represent one subframe N+1 called an empty subframe. This empty subframe is represented by a zone 61 during which the serial line (DATA-IO) is permanently at logic level "1". For an 8-bit byte this corresponds to the hexadecimal value FF. In this case, only phases "0" and "1" are entered.

FIG. 7 includes a more detailed view of the portion of the diagram of FIG. 2 located between the internal serial bus 6 and the parallel system bus 20. The internal serial bus 6 principally comprises one data input-output line 62 (DAT-IO), one clock pulse line 63 (CLK-B), and one synchronized frame clock line 64 (SYN-T). The bus 6 is connected to each of the adapter circuits described hereinbelow in detail with reference to FIGS. 8A–8E, 9 and 10.

The number of tens designating each adapter circuit in FIG. 7 corresponds to FIGS. 8A–8E, and the units digit corresponds to the place occupied by the circuit in the diagram of FIG. 2. Thus the FIG. 7 circuit 82 corresponds to the FIG. 2 adapter circuit 2 which couples between the internal serial bus 6 and the circuit 13 controlling multi-protocol communications. In FIG. 7, the elements belonging to the multi-protocol communication control circuit have numbers in the one hundreds and thirties; the number 13 and the units digits designate the elements of this circuit that particularly apply to the present invention. Hence reference numeral 130 in FIG. 7 designates the multi-protocol communication monitor microprocessor 13 of FIG. 2.

In FIG. 7 the microprocessor 130 is connected to the system bus 20, via a bus 131 to the adapter circuit 82, via a serializer-deserializer circuit 132 and line 1320 to the serial input-output channel A of the adapter circuit 82, via a serializer-deserializer circuit 133 and line 1330 to the serial input-output channel B of the adapter circuit 82, and via a serializer-deserializer circuit 134 and line 1340 to the serial input-output channel C of the adapter circuit 82. A state buffer circuit 135 is connected via the bus 131 to the microprocessor 130 and, via a bus 1350, to the adapter circuit 82. An 8 kHz clock oscillator 820 is connected to the frame clock input (CLK-T) of the adapter circuit 82 to generate the pulses for the beginning and end of the frame at the time of transmission.

The same diagram also applies to the FIG. 7 microprocessor 140 corresponding to the FIG. 2 image processing circuit 14; the reference numerals are simply greater by 10. Likewise the FIG. 7 microprocessor 150 corresponds to the FIG. 2 voice processing circuit 15.

FIGS. 8A-8E show an adapter circuit in greater detail representative of each of the FIG. 7 adapter circuits 82, 84, 85 and 81. As discussed above, an adapter circuit interfaces between the internal serial bus 6 and the processing circuits for data, images, voice, or telephone line interfaces, or any other circuit connected to the system bus 20. This adapter circuit provides three channels A, B and C, and includes three transmission circuits 90 corresponding to the channels A, B and C, as well as three reception circuits 100 corresponding to the channels A, B and C. A transmission circuit 90 is described in detail hereinbelow with reference to FIG. 9, and a reception circuit 100 is described in detail hereinbelow with reference to FIG. 10.

Each transmission circuit channel 90 receives its respective data signals DTA, DTB and DTC over a respective line 1320, 1330, 1340; a clock signal HTA, HTB or HTC originating in the system bus; and data originating in a bank of sixteen registers 86. This bank of sixteen registers 86 receives the transmission states of the channel B at its inputs ETB0-ETB3, the reception states of the channel B at its inputs ERB0-ERB3, and the reception states of channels A and C at its inputs ERC0 and ERA0. The different state signals are transmitted via the bus 1350.

This circuit also includes an input-output interface processor 87 between the register bank 86 and the associated microprocessor 130. The I/O interface processor 87 receive the signals of the FIG. 7 microprocessor 130 carried via the bus 131. The inputs A0-A3 represent the addresses of the sixteen registers 86 transmitted via the particular microprocessor (for example, 130), to which the adapter circuit 82 is connected.

At inputs-outputs D0-D4, this I/O interface processor 87 receives or transmits the data read or written into the registers 86, the data organized as five-bit words. This interface processor 87 includes a chip select input CS to enable reading and writing, a register read strobe input RD and a register write strobe input WR.

The reception circuits 100 of each of the channels A, B and C also output the data received DRA, DRB and DRC over the respective lines 1320, 1330, 1340 and the clock for each channel HRA, HRB, HRC. These data and this clock are transmitted to the microprocessor 130. The transmission circuits 90 for the channels A, B, C are connected in parallel via a line 99 to a serial input-output interface circuit 88. The serial I/O interface circuit 88 includes connections to the internal serial bus 6, specifically input-output DAT-IO connected to the line 62 input CLK-B connected to the line 63, and output SYN-T connected to the line 64. This interface circuit 88 also includes a clock input CLK-T for non-synchronized frames, and this input is used if the VAL-S input is enabled. The interface circuit 88 is described in detail hereinbelow with reference to FIG. 8E.

The input VAL-S is to enable synchronization with the clock 820 CLK-T in the case where the use of the frame synchronization clock SYN-T is not desired.

The reception circuits 100 are connected via a line 109 to the I/O interface circuit 88.

Figure 8C:
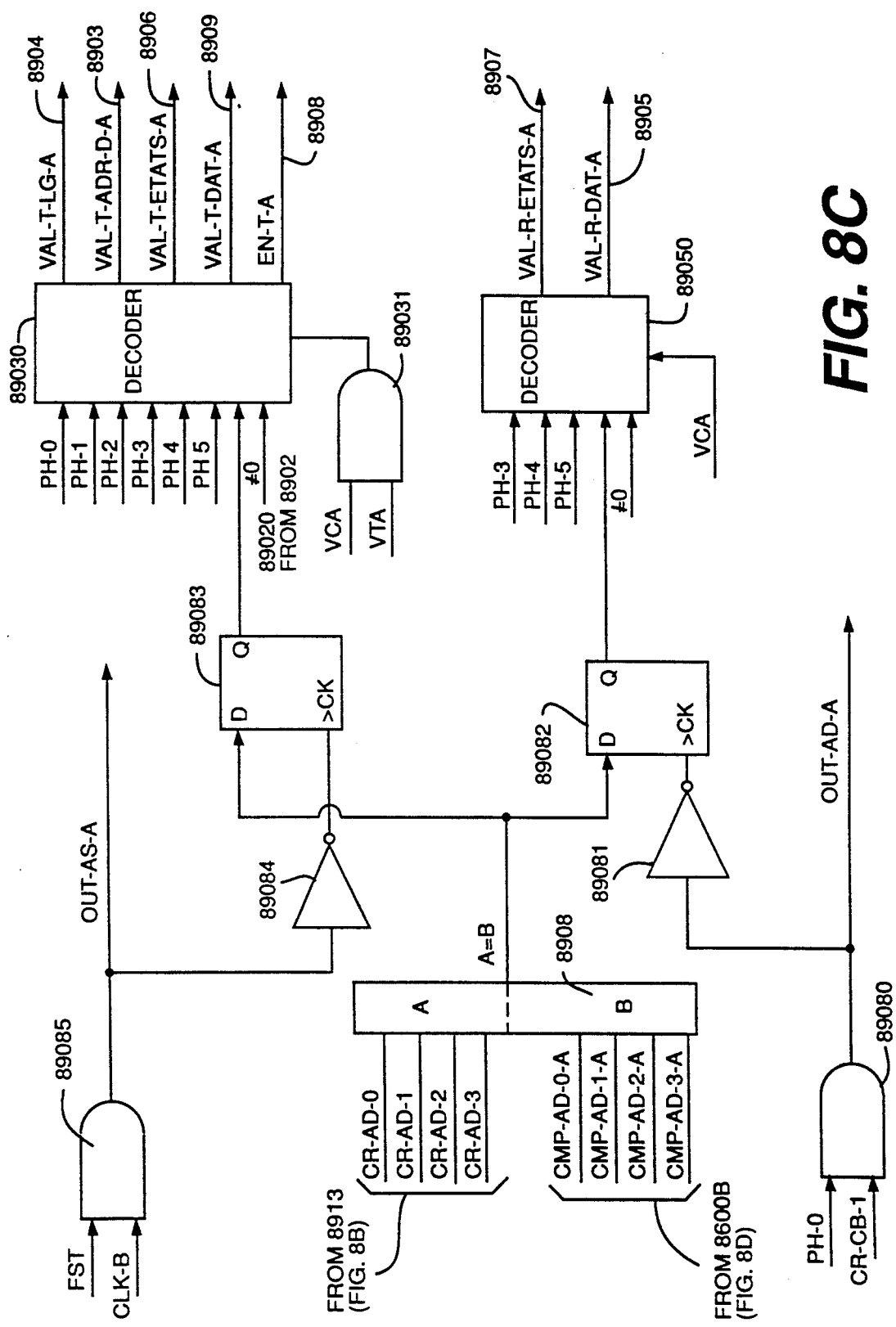
FIG. 8C is a schematic diagram of the address and command enable circuit included in the adapter circuit.

The line 109 is also connected to a subframe description circuit 891 (detailed in FIG. 3B) and to a circuit 890 for enabling addresses and commands (detailed in FIG. 8C).

The subframe description circuit 891, as has been seen above, also includes associated logic circuits, the circuit 891X the output 8910 providing the end of subframe signal (FST), the bit counter register 8911 (CR-BIT), the phase counter register 8912 (CR-PHASE), the PH-0 through PH-5 outputs of which indicate the processing phases of the subframe, and the subframe address counting register 8913.

Referring to FIG. 8B, the subframe description circuit 891 includes the bit counter 8911, the input of which receives the clock signal CLK-B. The bit counter 8911 is reinitialized to zero by the signal SYN-T applied to a RESET input. The bit counter 8911 counts from 0 to 7 and at its three outputs CR-B-0, CR-B-1 and CR-B-2 produces binary signals representing the number of bits received or transmitted that have been counted.

These bit counter outputs are connected to a logic circuit 891X comprising a programmable logic circuit. The logic circuit 891X has outputs 8912 representing the phase counter register CR-PHASE and which indicate the six processing phases of a subframe, and an output 8910 which provides the signal FST for the end of a subframe.

The logic circuit 891X receives at one input the signal SYN-T for frame synchronization. At a second input the logical circuit 891X receives an =31 signal from a comparator 8915 indicating that the number of 8-bit bytes read is equal to the maximum number of 8-bit bytes, minus one, that one frame can contain (in this case 31 bytes). At a third input the logic circuit 891x receives a ≠0 signal indicating that the number of bits remaining to be read differs from zero. At a fourth input the logic circuit 891X receives a <8 signal indicating this number of bits remaining to be read is less than eight. The ≠0 signal is furnished via the output 89020 of the down counter 8902. The <8 signal is furnished via the output 89021 of the down counter 8902. The eight parallel inputs of the down counter 8902 receive the eight outputs of a shift register 8914.

At its decrementation input −1, the down counter 8902 receives the clock signal CLK-B and, at its enable input VAL, receives the output signal of a NOR gate 8916, the two inputs of which receive the subframe processing phase "4" signal PH-4 and the phase "5", signal PH-5. The loading of this down counter 8902 is commanded by the signal PH-2 at the beginning of phase "2" of the subframe.

The shift register 8914 with serial inputs and parallel outputs receives the signal DAT-IN at its input. At its enable input VAL this shift register 8914 receives the output of a NOR gate 8918, the inputs of which receive subframe processing phase "0" signal PH-0 and the subframe processing phase "1" signal PH-1. The information loaded during phases "0" and "1" represents the number of 8-bit bytes to be read and the number of active bits in the final byte. This data is shifted in the register 8914 at the rate of the clock CLK-B.

The five shift register 8914 outputs 8901 having the highest significance are connected to the five inputs of the comparator circuit 8915 for comparing the number of 8-bit bytes to be read. The comparator 8915 outputs the =31 signal when the number of 8-bit bytes read equals 31 (decimal), which is 1F (hexadecimal), indicating an empty subframe.

Figure 8D:
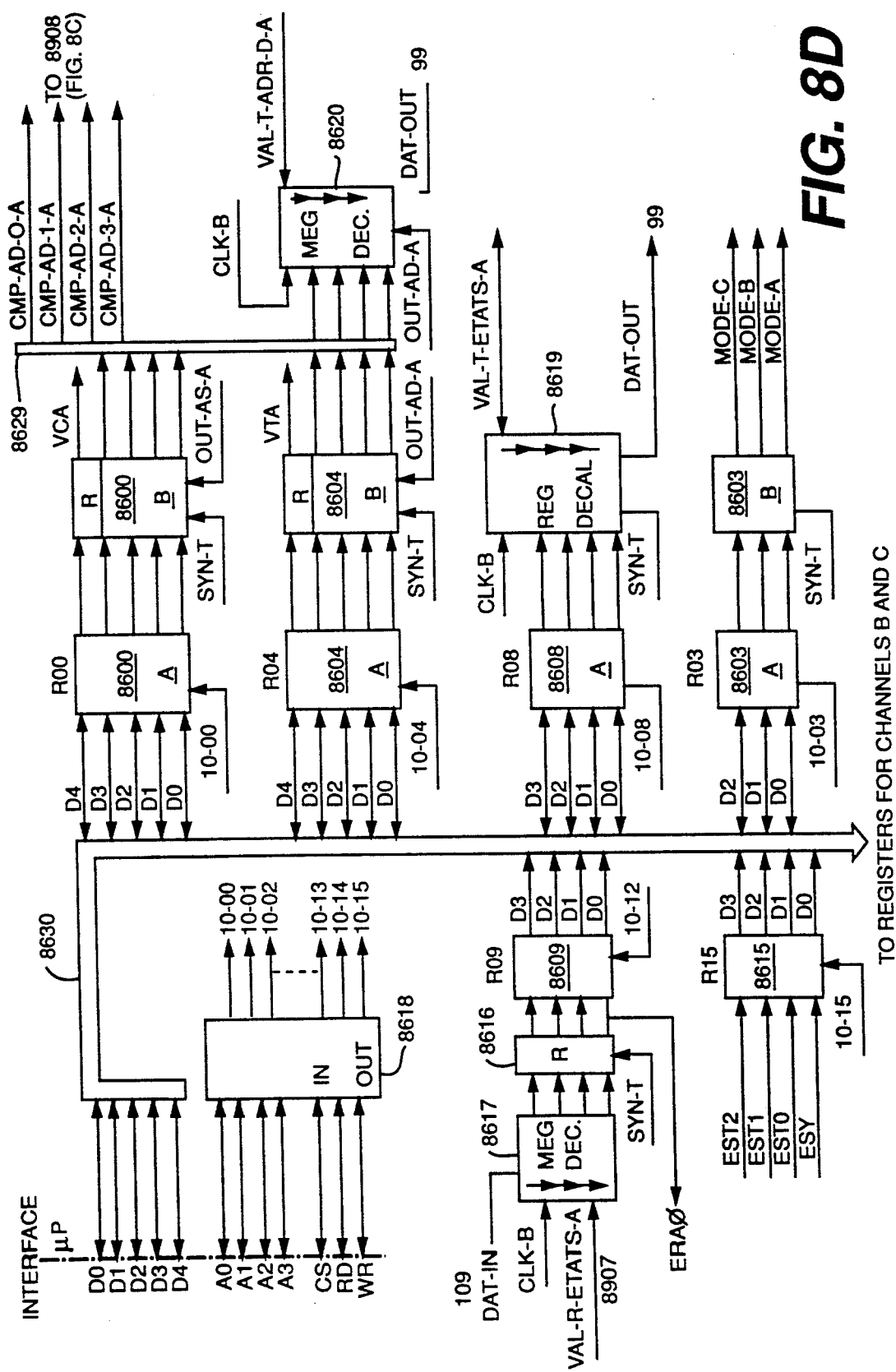
FIG. 8D is a schematic diagram of a bank of registers for channel A included in the adapter circuit.

There are four supplementary outputs 8917 of the logic circuit 891X, specifically the four signals EST0, EST1, EST2 and ESY, which respectively furnish the states of the subframe and the synchronization state. These four outputs 8917 are connected to the inputs of an R15 register 8615 (FIG. 8D).

The output PH-1 of the circuit 891X representing the beginning of phase "1" of a subframe is connected to the counting input of the subframe address counter 8913. The subframe address counter 8913 has four bit outputs CR-AD-0 through CR-AD-3 which comprise the subframe address and are connected to corresponding inputs of a comparator 8908 (FIG. 8C). The subframe address counter 8913 has its reinitialization input connected to the signal SYN-T, to permit its reinitialization at the beginning of the frame.

FIG. 8C shows in greater detail the FIG. 8A circuit 890 for enabling of the addresses and commands. This circuit 890 includes the comparator 8908 for comparing the address of the subframe received with the four outputs CMP-AD-0 through CMP-AD-3 from the outputs of an ROO register 8600-B (FIG. 8D) for the channel A. These inputs can also, in the cases of channels B and C, comprise the outputs of the corresponding registers R01 and R02. (See table hereinbelow.)

The A=B output of the comparator 8908 is connected to D inputs of each of two D-type flip-flops 89082 and 89083.

The Q output of the D-type flip-flop 89082 indicates that the destination address portion of the subframe is not in the course of being processed in the subframe corresponding to the desired addresses.

The D-type flip-flop 89082, at its clock input CK, receives the output of an inverter 89081, the input of which receives the output of an AND gate 89080. This AND gate 89080 receives at its first input the signal PH-0 representing the beginning of the phase "0" of a subframe, and at its second input the signal CR-B-1 comprising the output of significance 1 of the bit counter 8911, indicating that it is in the process of processing the bits "2" and "3" of phase "0" of one subframe.

The output of this AND gate 89080 also provides the signal OUT-AD-A, which causes the loading of a shift register 8620 (FIG. 8D) to prepare that shift register 8620 to serially transmit the subframe address signals to be transmitted as soon as the signal VAL-T-ADR-D-A has been transmitted by the decoder circuit 89030.

The other D-type flip-flop 89083 receives at its clock input CK the output of an inverter circuit 89084, the input of which receives the output of an AND gate 89085. This AND gate 89085, at a first input, receives the subframe synchronization signal FST furnished by the output 8910 of the logic circuit 891X (FIG. 8B), and at a second input receives the signal CLK-B on line 63 of the internal serial bus 6. The output of this AND gate 89085 also provides the signal OUT-AS-A which is used in FIG. 8D to enable the output of the register 8600-B containing the subframe address for the channel A. This makes it possible to transmit this subframe address to the comparator 8908 at each beginning of phase "0" of a subframe, and consequently, to be capable of comparing this value with the FIG. 8B subframe address received upon the beginning of the subframe, since as can be seen from FIG. 4, the subframe address counter 8913 is incremented at the time of the beginning of phase "1" of processing of the proceeding subframe.

The Q output of the D-type flip-flop 89083 is connected to one input of the decoder circuit 89030. At six other inputs the decoder 89030 receives the six signals PH-0 through PH-5 indicating the processing phase of a subframe and, at a supplementary input, receives the ≠0 signal from the output 89020 of the FIG. 8B down counter 8902 indicating that the number of bits differs from zero.

Figure 16:
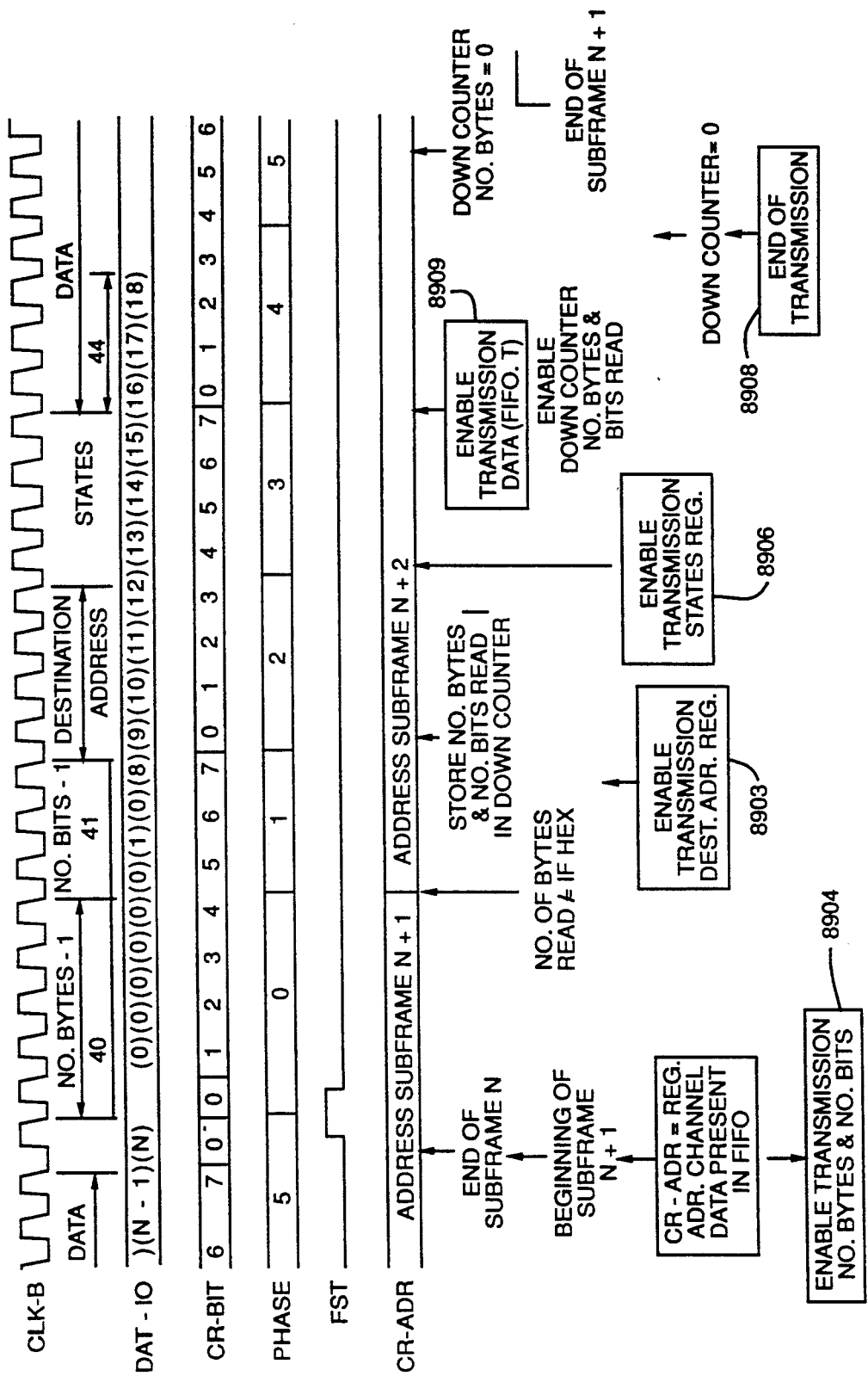

This decoder 89030, as a function of its input signals, provides five outputs as follows. The output 8904 provides the signal VAL-T-LG-A, which is the enable signal for channel A of the length of the subframe, this length comprising the number of 8-bit bytes and the number of bits to be transmitted as indicated in reference numeral 8904 (FIG. 16). The output 8903 provides the signal VAL-T-ADR-D-A, which is the enable signal for the transmission of the destination address register indicated by reference numeral 8903 (FIG. 16). The output 8906 provides the signal VAL-T-ETATS-A, which is the signal for transmission enable of the register of the states to be transmitted, and this enable takes place at the end of phase "2", as FIG. 16 shows. The output 8909 provides the signal VAL-T-DAT-A, which is the transmission enable signal of the data to be transmitted for the channel A, and this signal is transmitted at the end of phase "3", and the beginning of phase "4", as indicated by FIG. 16. Finally, the output 8908 provides EN-T-A the signal indicating the end of transmission, output during the course of phase "4" when the FIG. 8B down counter 8902 reaches zero.

The decoder 89030 receives at its enable input the output of an AND gate 89031. The AND gate 89031 at a first input receives the signal VCA for enabling of channel A, which as will be seen later comprises the first bit of the register 8600-B of FIG. 8D. At its second input the AND gate 89031 receives the signal VTA, which is the transmission enable signal of channel A, and comprises the first bit of the register 8604-B of FIG. 8D. Thus the decoder 89030 is not enabled unless the channel A associated with it must function for transmission. Similarly, for channel B and channel C, a corresponding decoder will be found.

The FIG. 8C comparator 8908 is in turn connected in parallel to the FIG. 8D bus 8629 which receives the parallel outputs of the three registers indicating, respectively, the addresses of the subframes for the channels A, B and C. (Only the register for channel A is actually shown in FIG. 8D.) In the case of coincidence, the corresponding channels are not enabled unless the registers contain the associated enable bits VCB, VCC, VTB and VTC.

The Q output of the D-type flip-flop 89082 is connected to one input of a decoder circuit 89050. Three other inputs of the decoder 89050 receive the subframe processing phase signals PH-3 through PH-5, and a final input receives the ≠0 signal originating at the output 89020 of the FIG. 8B down counter 8902 indicating that the length remaining to be read is not zero. At its enable input, the decoder 89050 receives the signal VCA comprising the enable bit for channel A, this signal being stored in the register 8600-B of FIG. 8D.

Figure 14:
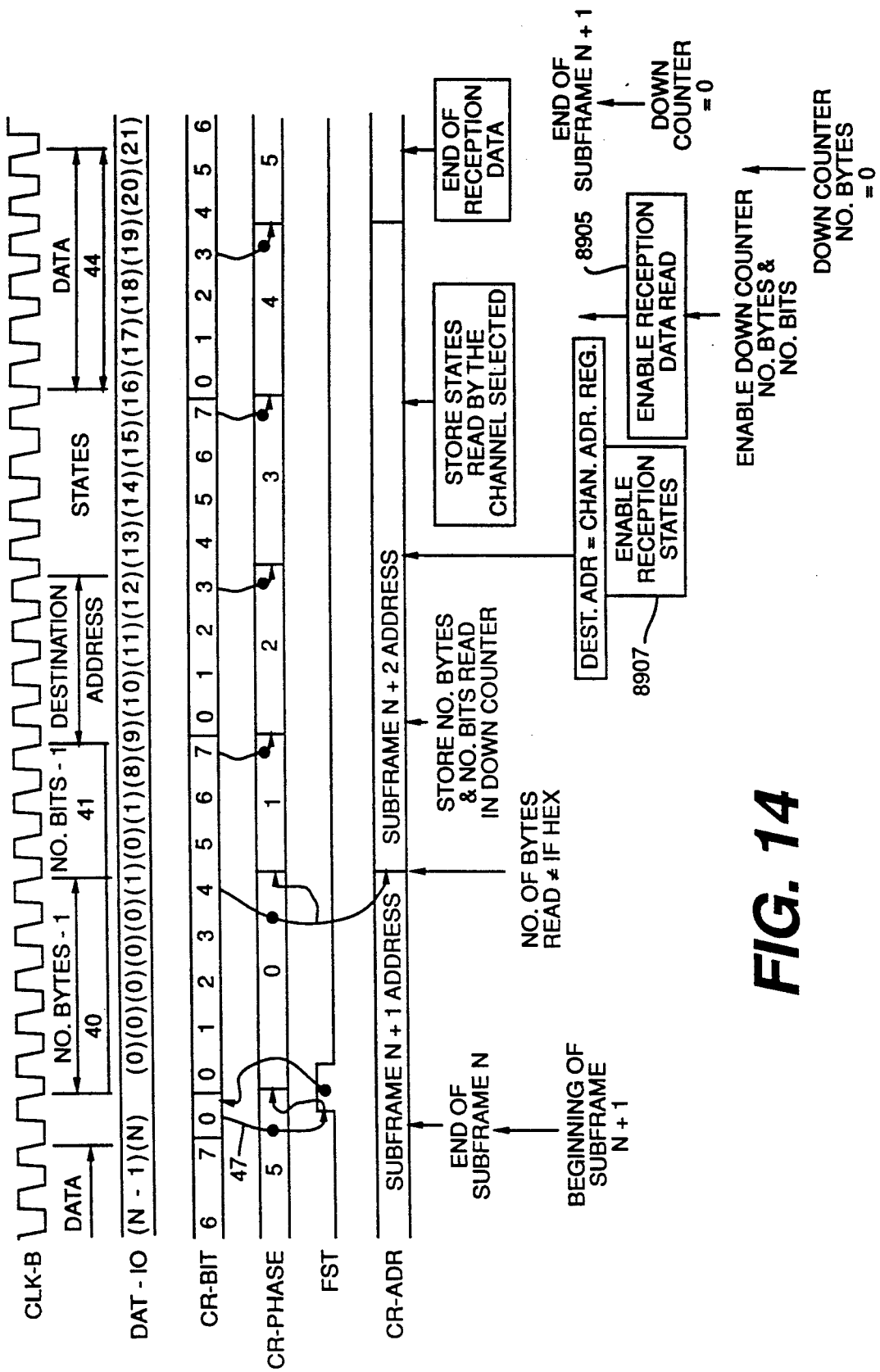

A first output 8907 of the decoder 89050 furnishes the signal VAL-R-ETAT-AS, which is reception enable signal of the states read, represented by the reference numeral 8907 in FIG. 14, a signal which is produced at the end of phase "2". A second output 8905 of the decoder 89050 furnishes the signal VAL-R-DAT-A, which is the reception enable signal of the data read and is a signal delivered as shown by reference numeral 8905 (FIG. 14) at the end of phase "3", of the processing of a subframe.

The following table summarizes the contents of the sixteen registers in FIG. 8A register bank 86. In addition, selected ones of these registers are depicted in FIG. 8D, particularly those corresponding to channel A.

| Register | Description | Bits |
|---|---|---|
| R00 8600-A | subframe address register for channel A (transmission and reception) | VCA = enable channel A ASA0:ASA3 = subframe address |
| R01 | subframe address register for channel B (transmission and reception) | VCA = enable channel B ASB0:ASB3 = subframe address |
| R02 | subframe address register for channel C (transmission and reception) | VCA = enable channel C ASC0:ASC3 = subframe address |
| R03 8603-A | mode register for channels A, B and C | definition of internal or external reception clock mode |
| R04 8604-A | destination address register: bits 4–7 of second 8-bit byte of the subframe transmitted via channel A | VTA = transmission enable ADA0:ADA3 = destination address |
| R05 | destination address register: bits 4–7 of second 8-bit byte of the subframe transmitted via channel B | VTB = transmission enable ADB0:ADB3 = destination address |
| R06 | destination address register: bits 4–7 of second 8-bit byte of the subframe transmitted via channel C | VTC = transmission enable ADC0:ADC3 = destination address |
| R07 | reserved | |
| R08 8608-A | transmission states register A: bits 0–3 of the second 8-bit byte of the subframe transmitted via channel A | ETA0:ETA3 = states to be transmitted |
| R09 8609 | transmission states register B: bits 0–3 of the second 8-bit byte of the subframe transmitted via channel B | ETB0:ETB3 = states to be transmitted |
| R10 | transmission states register C: bits 0–3 of the second 8-bit byte of the subframe transmitted via channel C | ETC0:ETC3 = states to be transmitted |
| R11 | reserved | |
| R12 | reception states register A: bits 0–3 of the second 8-bit byte of the subframe transmitted via channel A | ETA0:ETA3 = reception states |
| R13 | reception states register B: bits 0–3 of the second 8-bit byte of the subframe transmitted via channel B | ETB0:ETB3 = reception states |
| R14 | reception states register C: bits 0–3 of the second 8-bit byte of the subframe transmitted via channel C | ETC0:ETC3 = reception states |
| R15 8615 | status register | ESY = sychronization 0 = reset or non-sychronized 1 = sychronize GA-BTP |

-continued

| Register | Description | Bits |
|---|---|---|
| | | (detection of two phases, 1 and SYN-T) EST = subframe state (state of descriptor of subframe memorized by SYN-T) |

As noted above, FIG. 8D represents all the registers associated with one channel, in this case channel A, and the command signals associated with the registers.

In FIG. 8D, a register address decoder 8618 receives the four least significant address bits A0 through A3 from the associated microprocessor 130 and the control signals CS, RD and WR. As a function of these signals, the register address decoder 8618 selectively activates one of its sixteen outputs 10-00 through 10-15 to cause a corresponding one of the registers R00 through R15 to be loaded. The sixteen registers R00 through R15 are connected in parallel on a data bus 8630. However, only those corresponding to the channel A are shown in FIG. 8D; that is, the registers 8600-A, 8604-A, 8608-A, 8603-A, 8615, respectively comprising the registers R00, R04, R08, R03 and R15.

A first shift register 8617, at its serial input, receives the data on line DAT-IO of the internal serial bus 6. Data is shifted in at the rate of the clock CLK-B connected to the clock input of the shift register 8617 when the shift register 8617 enabled is by the signal VAL-R-ETATS-A from the output 8907 of the FIG. 8C decoder 89050 enabling the reception of the state values. The parallel outputs of this shift register 8617 are connected to a latch register 8916, the loading of which is commanded by the signal SYN-T or frame synchronization signal. These state values are transmitted to the data bus 8630 via a register 8609, which comprises the register R09 in the table above, when the R09 register 8609 is selected by the signal 10-12 from the register address decoder 8618.

The registers R00, R04, R08, R03 and R15 are loaded by the activation of the respective outputs 10-00, 10-04, 10-08, 10-03 and 10-15 during the processing phase of a frame N in the course of the operation identified by reference numeral 1501 (FIG. 15) commanded by the microprocessor 130 associated with the adapter circuit.

Next, with the signal SYN-T indicating the beginning of a frame, synchronization is performed, and the data contained in registers R00, R04, R03 and R08 is respectively transferred in parallel to output buffer registers 8600-B, 8604-B, 8603-B and to a shift register 8619.

At its serial output DAT-OUT, the shift register 8619 transmits the states to be transmitted corresponding to channel A. The shifting is enabled by the signal received at the output enable input, this signal being the signal VAL-T-ETATS-A from output 8906 of the FIG. 8C decoder 89030. The loading of the shift register 8619 is controlled by the signal SYN-T at the beginning of a frame. Finally, at its clock input, the shift register 8619 receives the signal CLK-B.

The register 8604-A representing the destination addresses for channel A and transmission enable address has these outputs connected to the inputs of a buffer register 8604-B. Three outputs of the buffer register 8604-B represent the destination addresses and are connected to the bus 8619 and to the parallel inputs of a shift register 8620. A fourth output of the buffer register 8604-B provides the signal VTA connected to the FIG. 8C AND gate 89031. The buffer register 8604-B is loaded in synchronism with the signal SYN-T, and the outputs are enabled by OUT-ADA. The shift register 8620 is loaded with the same signal OUT-ADA and its shifting out is clocked by CLK-B connected to its clock input. The shifting is enabled by the signal VAL-T-ADR-D-A from the output 8903 of the decoder 89030 of FIG. BC.

Figure 9:
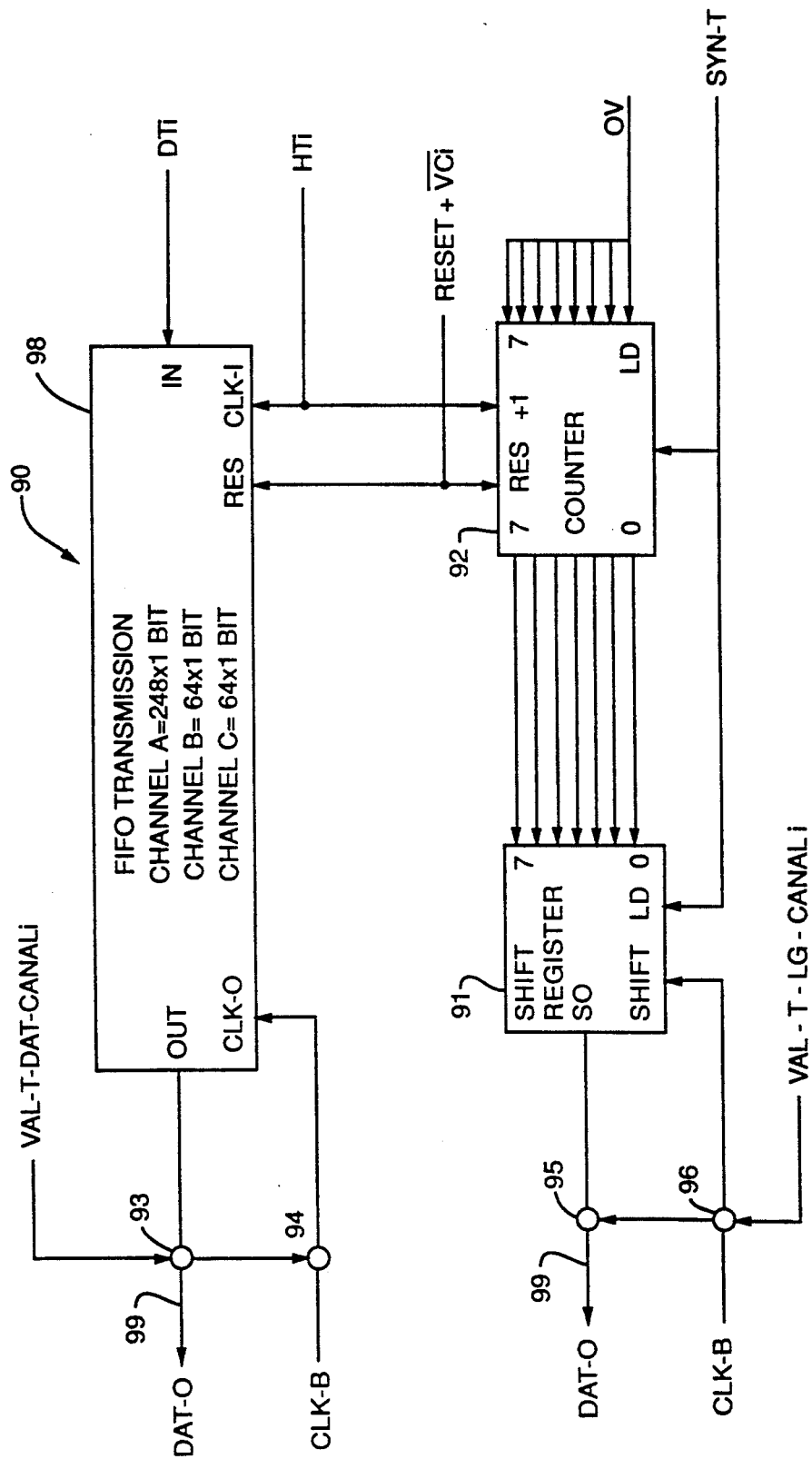
FIG. 9 is a schematic diagram of the transmission channel of the adapter circuit of FIG. 8A.

The DAT-OUT outputs of the circuits 8619 and 8620 are connected in parallel with the outputs 99 of the circuit of FIG. 9.

The register R03 comprising the circuit 8603-A is loaded on the command of the signal 10-03 with the data DO-D2 sent via the microprocessor at that instant. This register R03 represents the definition of the internal or external reception clock MODE for each of the channels A, B and C. The contents of this register are sent to a buffer register 8603-B, the loading of which is synchronized by the signal SYN-T. At its outputs the buffer register 8603-B provides a corresponding MODE signal for each of the channels A, B and C, a signal which is used at the inputs MODE and $\overline{\text{MODE}}$ of FIG. 10 for each of the channels in question.

Finally, the data ESTO through EST2 and the data ESY, respectively comprising the states of the subframe descriptor, and the synchronization states are stored in a register R15 comprising the circuit 8615, the loading of which is enabled via the output 10-15 of the decoder 8618.

Figure 8E:
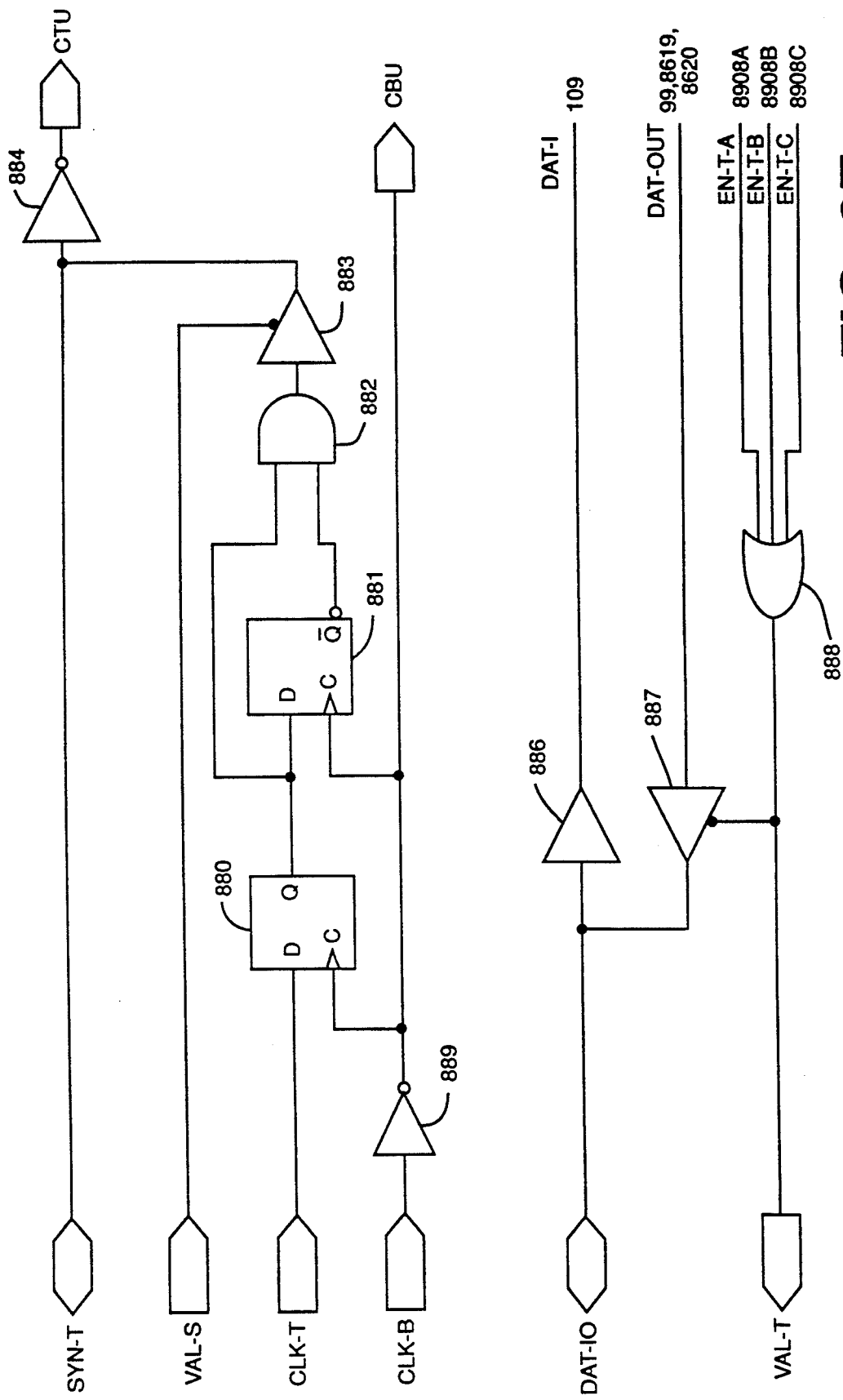
FIG. 8E is a schematic diagram of the portion of the clock synchronization circuit included in the adapter circuit.

The circuit of FIG. 8E represents the serial I/O interface circuit 88 of FIG. 8A, in greater detail. The transmission enable output VAL-T comprises the output of an OR gate 888, the three inputs of which receive the signals EN-T-A, EN-T-B, EN-T-C, respectively, from the output 8908 of the decoders 89030 (FIG. 8C for channel A) of the respective channels A, B and C.

The output of this OR gate 888 also enables the output buffer 887, the input of which receives the signal DAT-OUT comprising the connection in parallel of the corresponding outputs of the FIG. 8D shift registers 8619 and 8620, and output 99 of the circuit of FIG. 9. The output of the buffer 887 is connected via the DAT-IO terminal to the line 62 of the internal serial bus 6.

Another buffer 886 has its input connected to the DAT-IO line 62. This buffer 886 has its output connected respectively to the inputs DAT-I 109 of FIG. 10.

The signal CLK-T furnished by the FIG. 7 8 kHz clock oscillator 820 is connected to the D input of a D-type flip-flop 880, the clock input of which receives the signal CLK-B having a frequency of between 512 kHz and 2048 kHz, and inverted by an inverter 889. The Q output of the flip-flop 880 is connected to the D input of a second D-type flip-flop 881, the clock input of which likewise receives the signal CLK-B, inverted by the inverter 889.

The Q output of the multivibrator 880 and the output $\overline{Q}$ of the multivibrator 881 are connected to the two inputs of an AND gate 882, the output of which is connected to the input of a buffer 883 enabled by the signal VAL-S. The output of this buffer 883 provides the frame synchronization signal SYN-T and, via an inverter 884, generates the signal CTU.

FIG. 9 represents the transmission circuit for each of the channels A, B and C. This representative transmission circuit 90 comprises one FIFO register 98 for each channel. The output OUT of the FIFO register 98 provides the data signal to be transmitted. This signal is enabled through an AND gate 93, by the signal VAL-T-DAT-CANALi furnished for the channel A by the output 8909 of the FIG. 8C decoder 89030. The signal corresponding to the channel used is output by the decoder circuit 89030 associated with this channel. This signal transmitted via the output 8903 of the logic circuit 89030 (FIGS. 8C and 16) takes into account the enabling of the channel (VCA, VTA) and the change of the phase counter 8912 to state "2".

The enabling of the channel takes into account both the channel enable bit VCA and the transmission enable bit VTA contained for channel A in the registers R00 and R04, and also takes into account the result of the comparison in the FIG. 8C comparator 8908 between the address counter 8913 and the destination address furnished by one of the registers R00 through R02, depending on the validated channel.

This FIFO register 98 receives at its input IN the data DTi concerning the channel and arriving directly from one of the FIG. 7 serializer/deserializer circuits 132, 133 or 134, depending on the channel concerned. The data bits DTi are entered at the rate of the clock HTi furnished by the associated microprocessor 130 and arriving directly from the bus 131 over one of the inputs HTA, HTB or HTC, depending on the channel concerned. The data are output at the rate of the clock CLK-B oscillator 65 (FIG. 7) enabled by the AND gate 94 when the AND gate 94 receives the signal VAL-T-DAT-CANALi provided, for channel A, for example, by the output 8909 of the FIG. 8C decoder 89030.

The transmission circuit 90 also includes a counter 92 initially cleared to the value "0" when a pulse is transmitted at its loading input LD by the frame synchronization signal SYN-T furnished by the output of the buffer 883 (FIG. 8E). This counter 92 is incremented by pulses from the clock HTi, and thus counts the total number of data bits in the subframe to be transmitted in order to form the first header byte.

The eight parallel outputs of the counter 92 are connected to a parallel in, serial out shift register 91, the loading of which is likewise commanded by the signal SYN-T. Serial shifting out of the shift register 91 is commanded by the clock CLK-B to transmit the first header byte. This clock CLK-B is connected to the counter 92 through an AND gate 96, when this AND gate 96, at its other input, receives an enable signal VAL-T-LG-CANALi furnished, for the channel A, for example, by the output 8904 (FIG. 8C). This signal is furnished by the decoder 89030 (FIG. 8C) when the outputs 8912 and 8910 of the logic circuit 891X (FIG. 8B) furnishing the signal FST from the FIG. 8B OR gate 8916 signal the end of the preceding subframe, and when the subframe address counter 8913 (FIG. 8B) indicates the arrival of a subframe corresponding to the destination address. Beginning at that instant, the signal at the decoder 89030 output 8904 is active, and remains so during phases "0" and "1", to permit the transmission of the 8-bit byte representing the length of the subframe. This transmission is followed by the transmission of the destination address bits furnished to the output 99 by the output DAT-OUT of the shift register 8620 (FIG. 8D) and of the state bits furnished to the output 99 by the output DAT-OUT of the shift register 8619 (FIG. 8D).

The serial output of the shift register 91 likewise comprises the line 99, and this output is enabled through an AND gate 95 by the input VAL-T-LG-CANALi. The two signals VAL-T-LG-CANALi and VAL-T-DAT-CANALi allow time multiplexing of the line 99.

The FIFO register 91 of the channel in question (A) and the counter 92 are reinitialized by a signal based on a "RESET" signal transmitted by the microprocessor 13 logically "ORed" with the complement of the enable bit of the channel in question (VCi), this bit being located in one of the registers R00-R02.

It is also noted that in channel A, the FIFO register 90 has a capacity of 248 bits (31 bytes), while in channels B and C, the FIFO register 90 has a capacity of 64 bits (8 bytes).

Figure 10:
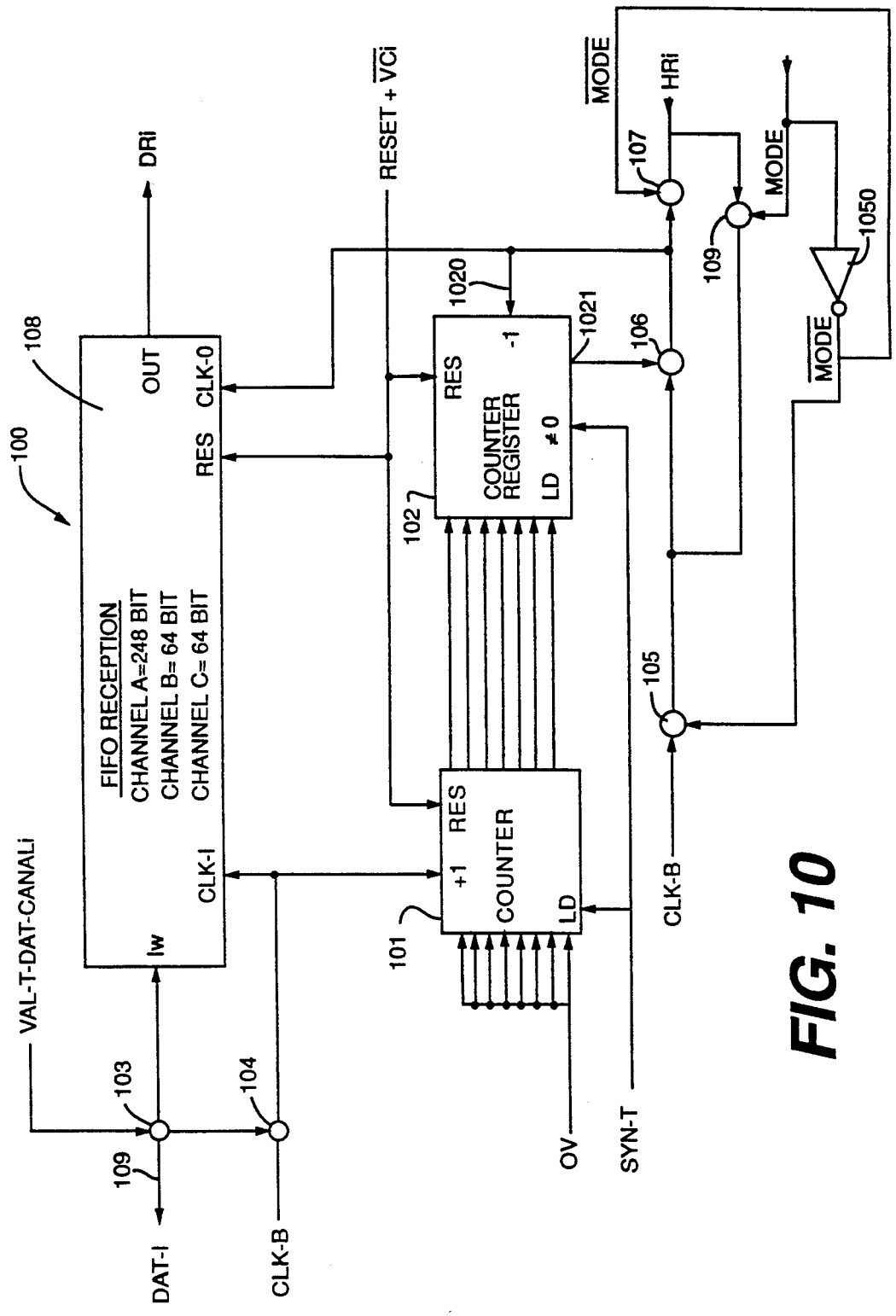
FIG. 10 is a schematic diagram of the reception channel of the adapter circuit of FIG. 8A.

The reception circuit 100 will now be explained, referring to FIG. 10. This circuit 100 comprises a FIFO register 108, the input of which receives the line 109 enabled through the AND gate 103 via the signal VAL-R-DAT-CANALi furnished for the channel A by the output 8905 of the decoder 89050 (FIG. 8C). This input likewise, via an AND gate 104, enables the signal CLK-B connected to the input CLK-I of the FIFO register 108. The output OUT of the FIFO register 108 comprises the output of data received DRi from each channel, connected respectively to the FIG. 7 circuit 132 for channel A, the circuit 133 for channel B, and the circuit 134 for channel C.

A counter 101 reset to zero likewise receives the signal CLK-B at its clock input. At its loading input LD the counter 101 receives the signal SYN-T. The eight parallel outputs of the counter 101 are connected to counter register 102, the decrementing input 1020 of which is connected to the input CLK-O of the circuit 108 receiving the data output clock for this circuit.

The clock signal of the data shift DRi and for decrementing of the counter register 102 thus comprises the external clock CLK-B enabled through the AND gate 105 by the signal $\overline{\text{MODE}}$ from the output of an inverter 1050, the input of which is connected to the MODE-A output of the circuit 8603-B (FIG. 8D) for the channel A. This clock signal at the output of the AND gate 105 is connected to an input of an AND gate 106, the second input of which receives the counter register 102 output 1021 which indicates that the value "0" has not yet been reached.

In a wired-OR configuration, the output of the AND gate 105 is combined with the output of the AND gate 109 prior to its introduction into the AND gate 106. The output of the AND gate 109 furnishes the internal clock signal HRi of the microprocessor when this signal is validated by the output MODE, furnished via the output MODE-A of the circuit 8603-B (FIG. 8D) for channel A.

Finally, the clock signal CLK-O can also comprise the output of the AND gate 109 when the signal MODE is active at a first input of this gate 109 and the internal clock HRi of the microprocessor 130 is transmitted over a second input of this gate 107. The signal VAL-R-DAT-CANALi is output by the FIG. 8C decoder 89050, which takes into account the channel enable signal VCA, VCB or VCC which originates in one of the registers R00-R02. The decoder 89050 also takes into account both the signal resulting from the comparison of the contents of the address counter 8913 and of one of the phase registers 8912 R00-R02, and the value of the outputs when they indicate that the value "4", has been attained.

Figure 12:
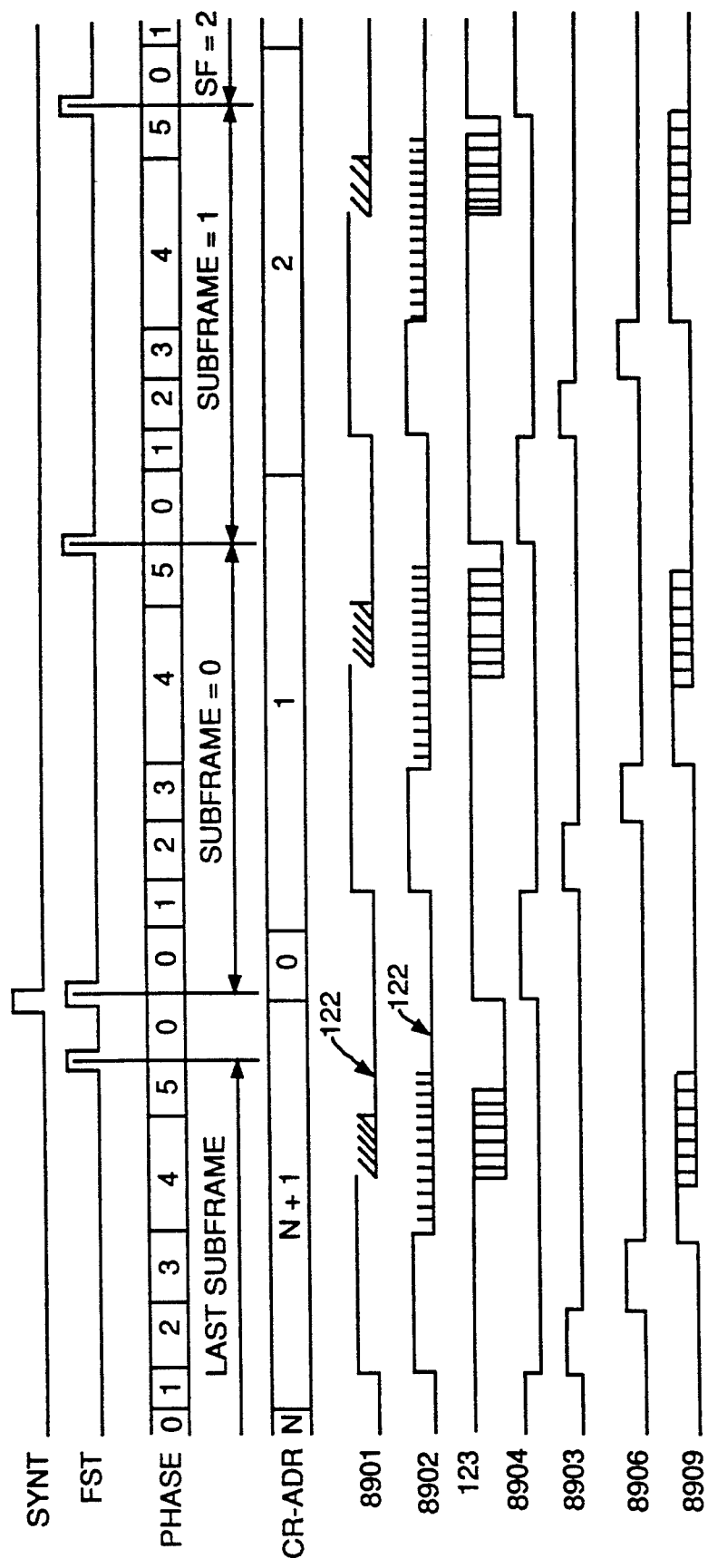
FIG. 12 is a waveform diagram depicting signals generated by the address and command enable circuit of the adapter circuit.

FIG. 12 shows the address and control signal waveforms furnished by the FIG. 8A subframe description circuit 891 detailed in FIG. 8B as a function of the frame synchronization signal SYN-T, the end of frame synchronization signal FST output 8910 of the circuit 891X, of the phase counter 8912 for processing each subframe, and of the subframe address counter 8913.

The signal waveform 8901 in FIG. 12 represents the output 8901 of the FIG. 8B shift register 8914. This is the sequence of the down counter of the number of 8-bit bytes remaining to be read, which is loaded into the circuit 8915 at the beginning of each phase "2", and changes to the value 0 in the course of phase "4", or at the latest, at the beginning of phase "5". The shaded zones correspond to the time during which the counter can change to 0, depending on its initial loading value.

The signal waveform 8902 in FIG. 12 represents the state of the down counter 8902 (FIG. 8B) that counts downward the number of 8-bit bytes and the number of bits remaining to be read. Represented is the loading of the down counter 8902 at the beginning of each phase "2", and its reaching a count of "0" in the course of phase "4" or phase "5", depending on the length of the subframe. As can be seen at 122, the down counter 8902 holds at "0", indicating there are no 8-bit bytes remaining to be read, if the subframe 120 is empty. Similarly, the down counter 8902 is loaded, if the length of the subframe is different from the corresponding hexadecimal value 1F for an empty subframe.

The signal waveform 123 in FIG. 12 represents the sequence of transmission enable signals furnished by the register bank 86 in the course if the processing phases of a subframe.

The signal waveform 8904 in FIG. 12 represents the VAL-T-LG-A output 8904 of the FIG. 8C decoder 89030. This is the zone length enable signal in the course of the phases "0" and "1" of processing of a subframe.

The signal waveform 8903 in FIG. 12 represents the VAL-T-ADR-D-A output 8903 of the FIG. 8C decoder 89030. This is the enable sequence of an address zone in the course of phase "2" of processing of a subframe.

The signal waveform 8906 in FIG. 12 represents the VAL-T-ETATS-A output 8906 of the FIG. 8C decoder 89030. This is the enable sequence of the state zone in the course of phase "3" of processing of a subframe.

The signal waveform 8909 in FIG. 12 represents the VAL-T-DAT-A output 8909 of the FIG. 8C decoder 89030. This is the sequence of the enable signal of the data zones in the course of phases "4 and 5", of processing of a subframe.

FIG. 11 represents the sequential diagram for bit clock signals CLK-B, nonsynchronized frame clock CLK-T, synchronized frame clock SYN-T, data inputs-outputs DAT-IO, the signal of the FIG. 8B bit counter CR-BIT 8911, the end of subframe signal FST furnished via the output 8910 of the FIG. 8B logic circuit 891, and signals for phases of processing of the subframes furnished via the outputs 8912 of the logic circuit 891.

Figure 15:
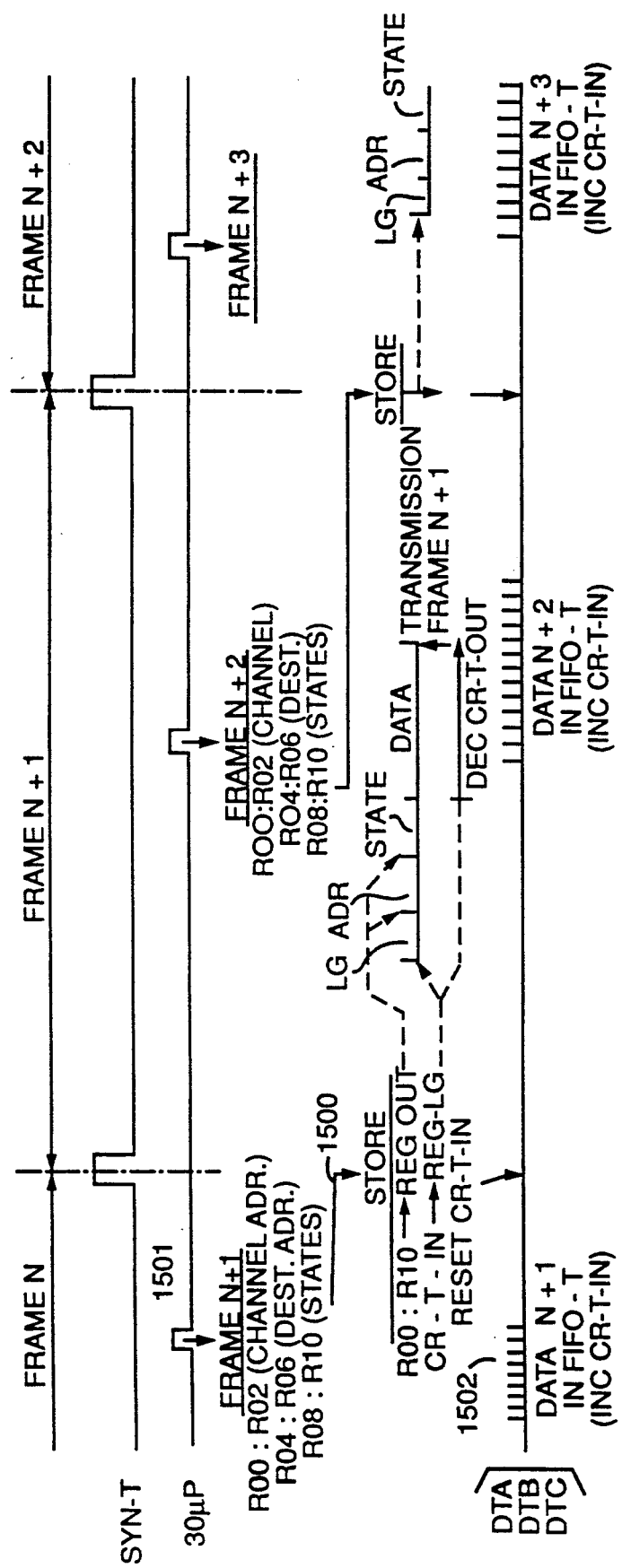
FIGS. 15 and 16 are waveform diagrams depicting transmission of a subframe N+1 of three data bits.

The functioning of the adapter circuit and of the apparatus described will now be explained in detail, referring to FIGS. 13 and 14 for reception and FIGS. 15 and 16 for transmission.

Figure 13:
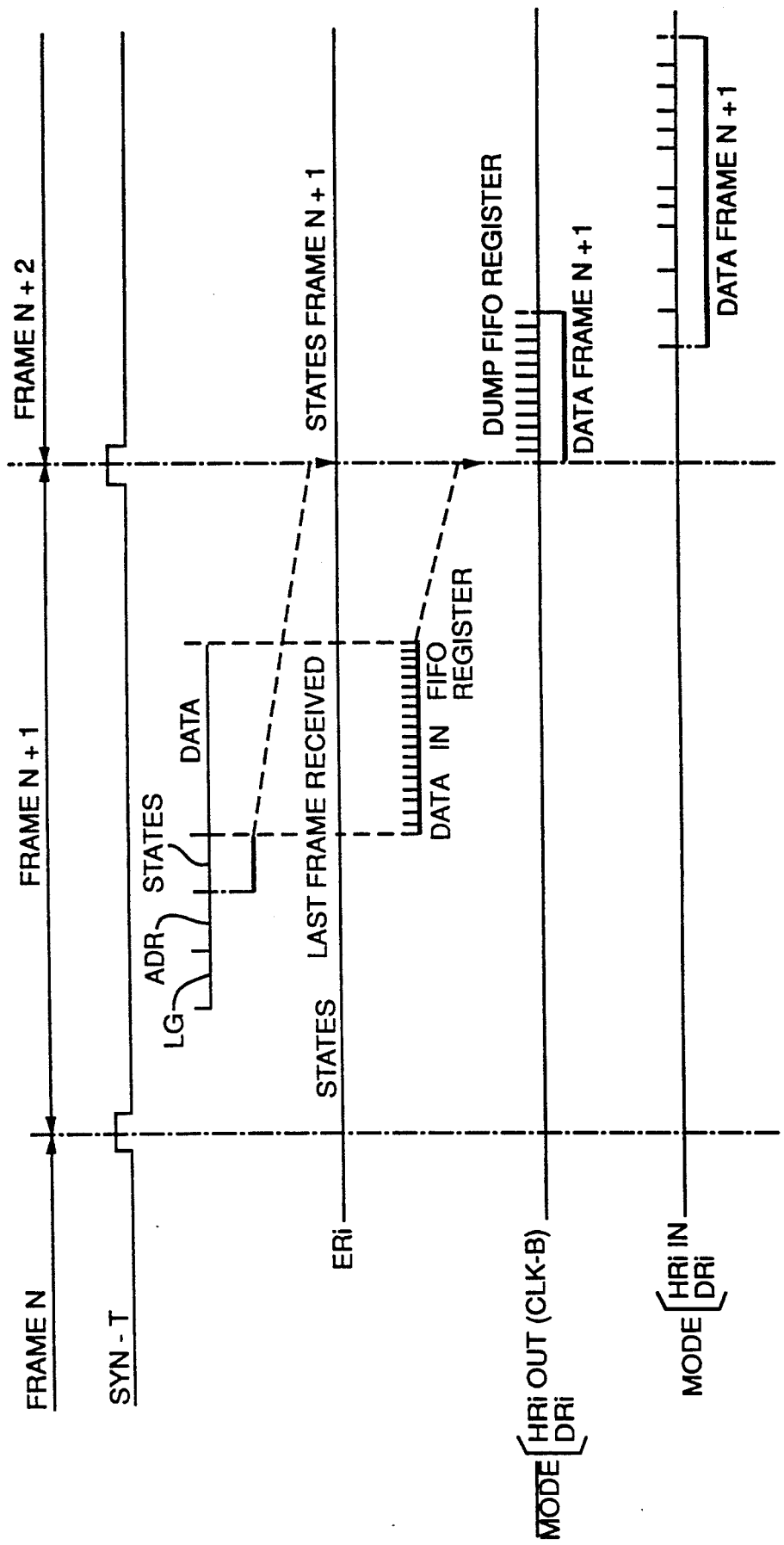
FIGS. 13 and 14 are waveform diagrams depicting reception of a subframe N+1 having six data bits.

The sequence of operation for reception is represented in FIGS. 13 and 14. A frame N+1 that is received includes six data bits in the example shown. Consequently its zone 41 includes the three-bit binary data "101", and zone 40 includes the five-bit binary data "00000".

At the end of phase "5" of subframe N, FST goes high and the bit counter CR-BIT (8911 in FIGS. 8A and 8B) is reinitialized to zero. The address counter circuit CR-ADR 8913, at the end of subframe N, indicates the address of subframe N+1, and after the first five bits of subframe N+1 (zone 40), corresponding to the activation of PH-1, indicates the address of subframe N+2.

At the end of phases "0" and "1", of subframe N+1, the value input in the course of this subframe into the shift register 8914 is stored in the circuit 8915 for describing the 8-bit byte length of the subframe, and in the down counter 8902 for the number of active bits in the final bytes.

The destination address is sent to the register R04 (8604 in FIG. 8D) of the bank of registers 86, assuming channel A reception operation. This destination address is sent at the end of phase "2".

At the end of phase "3", the states received over this channel A are stored in the register R12.

At the end of phase 11511, which includes only two data bits 20 and 21 in this phase, the data are sent via the line DRI to the direction of the data deserialization circuit 132 for the benefit of the microprocessor 130.

At the end of subframe N+1, the down counter 8902 is reset to zero.

In actuality, as can be seen in FIG. 11, the transmission of the data comprising the emptying of the FIFO stack 108 in the direction of the microprocessor takes place at the beginning of processing of the frame N+2 by the subframe description circuit. During the time that the description circuit executes phases "0" and "1", the transmission in the direction of the microprocessor takes place.

The sequence of operation by the adapter circuit for transmission will now be described, in conjunction with FIGS. 15 and 16.

In the course of step 1501, by a command sent to the input WR and the selection signal of the register at the input CS of the adapter circuit (FIG. 8), the microprocessor 13 writes the address of the channel in the registers R00-R02, the destination address in the registers R04-R06, and the transmission states in the registers R08-R10 of the bank of registers 86. These data are stored at the time the frame synchronization signal appears, indicating the end of frame N. Also at the end of frame N, the microprocessor 130 sends the data for frame N+1, for example to the corresponding FIFO register of channel A. During the processing of frame N+1 for transmission by the adapter circuit, the microprocessor 130 loads the corresponding registers and FIFO registers with the information necessary for transmission, so that transmission can be performed during the next frame N+2, as shown in FIG. 15.

FIG. 16 represents the steps in transmission of a three-bit subframe N+1. At the end of the subframe N indicated by phase "5" of this subframe and by the pulse FST, the address counter 8913 contains the address of the subframe N+1. During the phase 1502 of loading data to be transmitted into the stack 98, the circuit 92, incremented at each data bit, records the length of the subframe. This length is transmitted by the circuit 91 when its output is validated by the signal VAL-T-LG-CANALi, furnished for channel A, for example, by the output 8904 (FIG. 8C). The register R04, for example, for channel A 8620 will send the destination address to the output 891. The decoder circuit 89030 causes this destination address to be followed by the transmission of the register R08 containing the states to be transmitted, which are furnished by the circuit 8619. Next, the data 44 stored in the FIFO stack are transmitted as soon as the enable signal VAL-D-DAT-CANALi appears.

At the end of the transmission in the course of phase "4", the down counter 8902 of the number of bits remaining to be read in the subframe returns to zero and indicates the end of the transmission. The following frames are processed identically.

Figure 17:
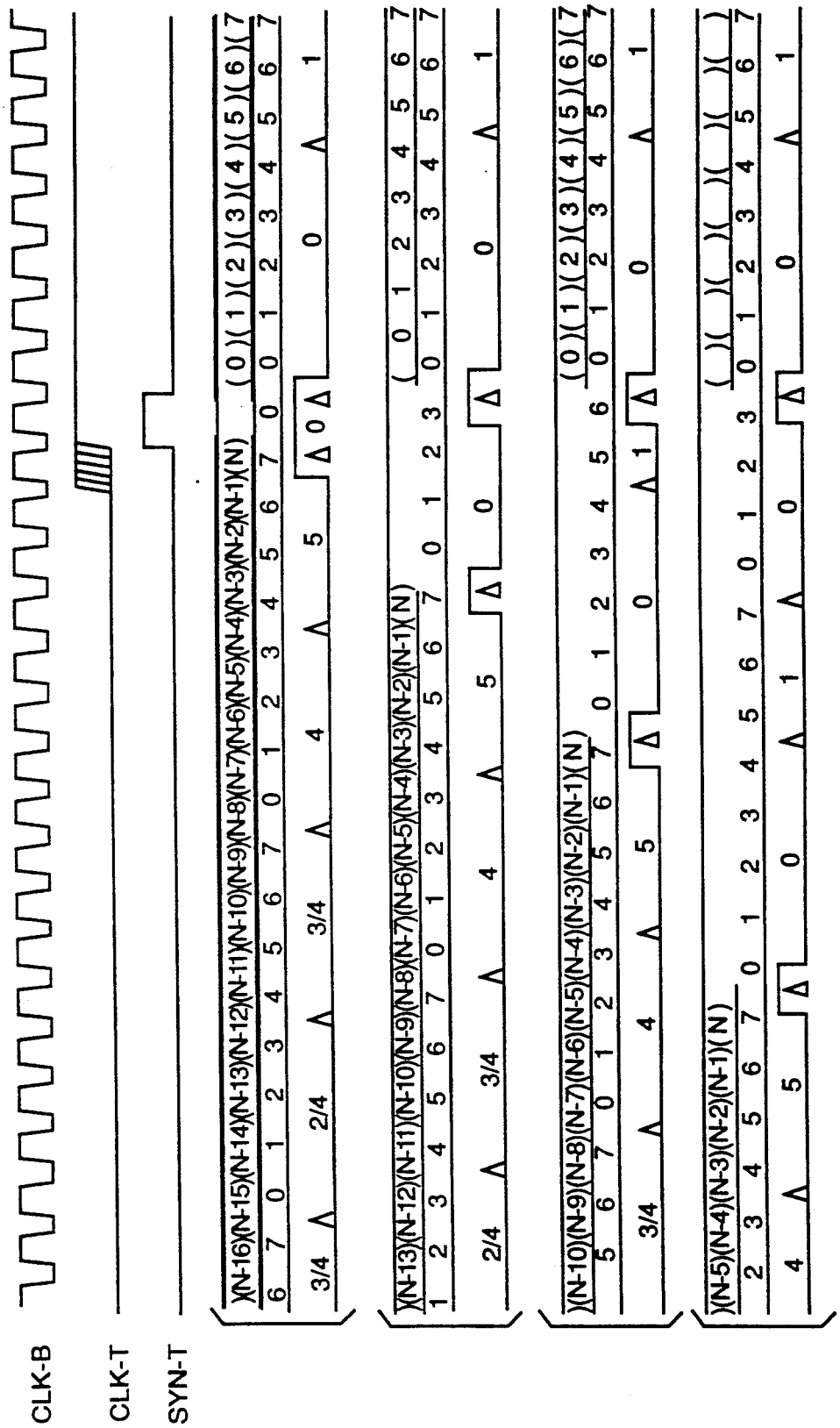
FIG. 17 are waveform diagrams depicting end-of-frame and beginning-of-frame processing sequences.

FIG. 17 shows the sequence diagrams for processing the end of frames and beginning of a frame with respect to the bit clock signals CLK-B, the nonsynchronized frame clock signals CLK-T, and frame synchronization signals SYN-T.

The system thus described for example makes it possible to provide a 64 kbps data link as follows. Compressed image data at a rate of 64 kbps is received by the FIG. 2 telephone line interface 10 and transmitted via transmission channel B of the adapter circuit 1 (81 in FIG. 7) and via the internal serial bus 6 to the reception channel B of the adapter circuit 4 (84 in FIG. 7) of the FIG. 2 image compression and decompression module 14 (microprocessor 140 in FIG. 7). The image, decompressed by the microprocessor 140, is retransmitted via the transmission channel A of this same adapter circuit 4 at a rate as high as 2048 kbps to the reception channel A of the adapter circuit 3 (83 in FIG. 7) corresponding to the serial interface module 16.

Simultaneously, a full duplex X25 link at 64 kbps, also received via the telephone line interface 10, is transmitted over the transmission channel B of the corresponding adapter circuit 1 (81 in FIG. 7) via the internal serial bus 6 to the reception channel B of the adapter circuit 2 (82 in FIG. 7) for the multi-protocol communication controller module 13. Since this is a full duplex link, the transmission channel A of the adapter circuit 2 also transmits subframes over the internal serial bus 6 to the reception channel B of the adapter circuit 1.

It will be appreciated that various modifications within the competence of one skilled in the art are equally included in the spirit and scope of the invention.

What is claimed is:

1. A method of data transmission via a serial bus (6) internal to a workstation for providing communication in cooperation with the workstation between a telephone communication line interface coupler device (10) and a plurality of communication processing devices (13, 14, 15, 16), said method comprising:
   a) employing a synchronization signal of an external voice network to define a communication frame;
   b) including in each frame a maximum of eight variable-length subframes respectively corresponding to a maximum of eight devices, each device having a particular device destination address, each of the subframes having a plurality of bytes including first and second header byes and including data byes in turn including data bits;
   c) coding the first five bits (40) of the first header byte to indicate the number of data bytes in the subframe;
   d) coding the next three bits (41) of the first header byte to indicate the number of data bits of the last data byte; and
   e) coding four bits (42) of the second header byte to indicate a device destination address, 2. A method in accordance with claim 1, which further comprises providing adapter circuitry for each communication processing device (13, 14, 15, 16) operable to process only subframes in which the device destination address coded in the second header byte corresponds to the particular device destination address.

3. A method in accordance with claim 1, wherein each variable-length subframe has a maximum length of 32 bytes.

4. A method in accordance with claim 2, wherein each variable-length subframe has a maximum length of 32 bytes.

5. A method in accordance with claim 1, which comprises coding the first header byte of a subframe having zero data bytes with the value hexadecimal FF.

6. A method in accordance with claim 3, which comprises coding the first header byte of a subframe having zero data bytes with the value hexadecimal FF.

7. A serial bus apparatus internal to a computer workstation having a parallel system bus for interfacing the computer workstation with a plurality of data input/output/processing devices, said serial bus apparatus comprising:
an internal serial bus (6) including an input-output data line (62), a frame synchronization line (64) and a bit clock line (63), said internal serial bus serving to interface with:
 a) a telephone line interface (10) via a first bus adapter circuit (1);
 b) a multi-protocol communication controller (13) connected to said workstation parallel system bus via a second bus adapter circuit (2) for interfacing a serial data communication channel to said parallel system bus;
 c) a serial interface (16) for at least one of a printer (17) and a scanner (18) via a third bus adapter circuit (3);
 d) an image processor (14) connected to said workstation parallel system bus for performing at least one of the functions of image compression, image decompression, decoding, encoding, or facsimile transmission via a fourth bus adapter circuit (4); and
 e) a voice processor (15) connected to said workstation parallel system bus for performing at least one of the functions of voice analysis, vocal control of peripheral equipment, voice synthesis via a fifth bus adapter circuit (5).

8. An adapter circuit for interfacing data in addressed subframe between a serial bus (6) internal to a workstation and a data input/output/processing device (13,14) having a particular device destination address and connected to a parallel system bus (20) of said workstation, and for providing at least two serial transmission/reception channels (A, B, C), said adapter circuit comprising:
 a) a transmission channel circuit (90) within each of said transmission/reception channels (A, B, C), and connected to said parallel system bus (20) through the device (13, 14), for processing data transmitted from said device (13, 14) via each of said at least two serial transmission/reception channels (A, B, C);
 b) a reception channel circuit (100) within each of said transmission/reception channels (A, B, C), and connected to said parallel system bus (20) through the device (13, 14), for processing data received by said device (13, 14) via each of said at least two serial transmission/reception channels (A, B, C);
 c) a register bank (86) of addressable five-bit registers connected to said transmission channel circuits (90) and to said reception channel circuits (100) for receiving data transmitted to and received from said device (13, 14) and for storing information denoting the states of said serial transmission/reception channels (A, B, C) as transmitting to or receiving from said device (13, 14);
 d) a subframe description circuit (891) connected to the internal serial bus (6) for providing timing signals derived in part from said serial bus (6) and for processing said timing signals to provide information denoting the states of said serial transmission/reception channels (A, B, C) to said register bank (86), said timing signals corresponding to at least the function of end of subframe; and
 e) subframe address enable and control circuitry (890) connected to said transmission channel circuits (90) and to said reception channel circuits (100) and to said register bank (86) for examining subframe addresses and for providing enabling and control signals to said register bank (86) corresponding to at least one of the functions of data reception enable, data transmission enable, end of transmission.

9. An adapter circuit in accordance with claim 8, wherein at least on register (R00, R01, R02) of said register bank (86) contains a subframe address which designates one of said transmission/reception channels, and an enable bit (VCA, VCB, VCC) which enables transmission or reception via at least one of said transmission/reception channels.

10. An adapter circuit in accordance with claim 8, wherein said transmission/reception channels are operable to selectively function in a transmission mode, and further wherein at least one register (R08, R09, R10) of said register bank (86) contains bits indicating whether said transmission/reception channels (A, B, C) operating in a transmission mode are idle or transmitting.

11. An adapter circuit in accordance with claim 9, wherein said transmission/reception channels are operable to selectively function in a transmission mode, and further wherein at least one register (R08, R09, R10) of said register bank (86) contains bits indicating whether said transmission/reception channels (A, B, C) operating in a transmission mode are idle or transmitting.

12. An adapter circuit in according with claim 8, wherein said selectively function in a reception mode, and further wherein at least one register (R12, R13, R14) of said register bank (86) contains bits indicating whether said transmission/reception channels (A, B, C) operating in the reception mode are idle or receiving.

13. An adapter circuit in accordance with claim 9, wherein said transmission/reception channels are operable to selectively function in a reception mode, and further wherein at least one register (R12, R13, R14) of said register bank (86) contains bit indicating whether said transmission/reception channels (A, B, C) operating in the reception mode are idle or receiving.

14. An adapter circuit in accordance with claim 8, wherein at least one register (R15) of said register bank (86) is a status register including information on transmission or reception synchronization and said subframe description circuit.

15. A method of data transmission in accordance with claim 2 further including the step of setting the eight variable length subframes to a maximum length of two bytes.

16. A method according to claim 2 further including the step of defining said communication frame as a 125 micro second frame.

* * * * *

UNITED STATES PATENT AND TRADEMARK OFFICE
CERTIFICATE OF CORRECTION

PATENT NO. : 5,289,465
DATED : February 22, 1994
INVENTOR(S) : MOURO et al

It is certified that error appears in the above-indentified patent and that said Letters Patent is hereby corrected as shown below:

Col. 20, line 53 (Claim 1, line 14) both occurrences of the word "byes" should be --bytes--.

Col. 21, line 44 (Claim 8, line 2) "subframe between" should be --subframe format between--.

Col. 22, line 43 (Claim 13, line 2) after "...with claim 8, wherein said..." insert --transmission/ reception channels are operable to--.

Col. 22, line 52 (Claim 13, line 5) "bit" should be --bits--.

Col. 22, line 62 (Claim 15, line 2) "claim 2" should be --claim 1--.

Col. 22, line 64 (Claim 16, line 1) "claim 2" should be --claim 1--.

Signed and Sealed this

Third Day of January, 1995

*Attest:*

BRUCE LEHMAN

*Attesting Officer*  *Commissioner of Patents and Trademarks*